(12) United States Patent
Nakamoto et al.

(10) Patent No.: US 7,158,351 B2
(45) Date of Patent: Jan. 2, 2007

(54) MAGNETIC RECORDING AND REPRODUCING HEAD RESTRAINING A SIDE READING

(75) Inventors: Kazuhiro Nakamoto, Odawara (JP); Hiroyuki Hoshiya, Odawara (JP); Chiaki Ishikawa, Kokubunji (JP)

(73) Assignee: Hitachi Global Storage Technologies, Kanagawa-ken (JP)

( * ) Notice: Subject to any disclaimer, the term of this patent is extended or adjusted under 35 U.S.C. 154(b) by 0 days.

(21) Appl. No.: 11/195,782

(22) Filed: Aug. 3, 2005

(65) Prior Publication Data

US 2005/0264948 A1 Dec. 1, 2005

Related U.S. Application Data

(63) Continuation of application No. 10/453,556, filed on Jun. 4, 2003, now Pat. No. 6,967,823.

(30) Foreign Application Priority Data

Nov. 26, 2002 (JP) ............................. 2002-341669

(51) Int. Cl.
*G11B 5/33* (2006.01)
(52) U.S. Cl. .................................................. 360/319
(58) Field of Classification Search .................. None
See application file for complete search history.

(56) References Cited

U.S. PATENT DOCUMENTS 6,023,395 A 2/2000 Dill et al.
6,680,829 B1 1/2004 Chen et al.
6,980,403 B1 * 12/2005 Hasegawa ................... 360/319

FOREIGN PATENT DOCUMENTS

| JP | 3-125311 | 9/1990 |
|----|----------|--------|
| JP | 6-267027 | 3/1993 |
| JP | 7-057223 | 7/1994 |
| JP | 11-259824 | 3/1998 |

OTHER PUBLICATIONS

Thomas C. Anthony, Steven L. Naberhuis, James A. Brug, Manoj K. Bhattacharyya, Lung T. Tran, Victor W. Hesterman and Gerald G. Lopatin, "Dual Strip Magnetoresistive Heads for High Density Recording", IEEE Transactions on Magnetics, vol. 30, No. 2, Mar. 1994, pp. 303-308.

* cited by examiner

*Primary Examiner*—David Davis
(74) *Attorney, Agent, or Firm*—Reed Smith LLP; Stanley P. Fisher, Esq.; Juan Carlos A. Marquez, Esq.

(57) ABSTRACT

A magnetic recording head includes an upper shield layer, a lower shield layer, a magnetoresistive film interposed between the upper shield layer and the lower shield layer, and a pair of leads electrically coupled to the magnetoresistive film, in which a pair of side shield layers constituted by portions of the upper shield layer is formed on both sides of the magnetoresistive film, and a spacing between each side shield layer and the magnetoresistive film is formed to be narrower than twice of a spacing between the upper shield layer and the lower shield layer, thereby a side reading amount can be made smaller than a conventional side reading value determined from the spacing between the upper and lower shield layers and a magnetic spacing between the head and a medium.

4 Claims, 13 Drawing Sheets

MAGNETIC RECORDING AND REPRODUCING HEAD RESTRAINING A SIDE READING

This application is a Continuation application of nonprovisional U.S. Application Ser. No. 10/453,556 filed on Jun. 4, 2003 now U.S. Pat. No. 6,967,823. Priority is claimed based upon U.S. Application Ser. No. 10/453,556 filed on Jun. 4, 2003, which claims the priority date of Japanese Patent application 2002-341669 filed on Nov. 26, 2002, all of which are incorporated by reference herein.

BACKGROUND OF THE INVENTION

1. Field of the Invention

The present invention relates to a magnetic head used on a magnetic recording and reproducing apparatus, and the magnetic recording and reproducing apparatus that uses the magnetic head.

2. Description of the Related Art

Magnetic recording and reproducing apparatuses include a medium for magnetically recording information, a magnetic head for recording the information on and reproducing the information from the medium, a recording and reproducing operation control circuit for reproducing the information based on an output signal from the magnetic head and recording the information based on an input signal, a mechanism for turning the medium, and a positioning mechanism for determining a position of the magnetic head relative to the medium.

A write element constituting the magnetic head includes a coil for generating a magnetic flux, a pair of magnetic cores for collecting the magnetic flux, and a write gap disposed between the pair of the magnetic cores so as to generate a magnetic field. A film formed of a nickel and iron alloy such as $Ni_{80}Fe_{20}$ or $Fe_{55}Ni_{45}$, a film formed of an iron and cobalt alloy such as $Fe_{70}Co_{30}$ or $Fe_{50}Co_{50}$, a cobalt-based alloy film, or a film formed by stacking approximately two layers of these films are commonly employed for the magnetic cores. A film thickness of each of the cores is often set to approximately 1 to 5 μm in a longitudinal write head. In a perpendicular write head, the film thickness of a main pole is often set to approximately 50 to 200 nm, while the film thickness of a return pole is often set to one to several micrometers. A write operation is performed by applying to the medium the magnetic field generated at the write gap resulting from passage of a write current through the coil.

A read element for the magnetic head includes a pair of magnetic shield layers, a magnetoresistive film interposed between the magnetic shield layers, being apart from a predetermined distance from the magnetic shield layers, and a pair of leads for being electrically coupled to the magnetoresistive film. The pair of magnetic shield layers is present to detect a change in the magnetic field leaked from the medium based on recorded information at high resolution. The narrower a spacing between the pair of shield layers is, the higher resolution can be made. Thus, there is a trend toward the narrower and narrower shield spacing for adapting to a higher recording density of the magnetic recording and reproducing apparatus in the future. In addition to a function described above, the magnetic shield layers also serve to liberate heat that has generated from the magnetoresistive film due to passage of a sensing current, to their outside. The $Ni_{80}Fe_{20}$ film or an alloy film based on these materials is often employed for the magnetic shield layers. An alloy film such as a Sendust (Fe—Al—Si) film or a cobalt-based amorphous alloy film may also be employed for a shield layer on a substrate side or a lower shield layer. The film thickness of each of the shield layers is generally set to approximately 1 to 5 μm.

In the case of the magnetic recording and reproducing apparatus with an areal density of 100 gigabits per square inch, a high sensitivity sensor such as a GMR film using a giant magnetoresistive effect or a TMR film using a tunneling magnetoresistive effect is employed as the magnetoresistive film.

The GMR film is constituted by a multilayer film that includes a first ferromagnetic layer, a second ferromagnetic layer, and a non-magnetic conductive layer. The first ferromagnetic layer has a thickness of approximately 1 to 10 nm, and its magnetization direction changes, depending on the magnetic field that leaks from the medium. The second ferromagnetic layer has a thickness of approximately 0.5 to 5 nm, and its magnetization direction is generally fixed. The non-magnetic conductive layer is interposed between the first ferromagnetic layer and the second ferromagnetic layer, and has a thickness of approximately 0.5 to 5 nm.

The TMR film is constituted by a: multilayer film that includes the first ferromagnetic layer, the second ferromagnetic layer, and a barrier layer. The first ferromagnetic layer has an approximately 1 to 10 nm in thickness and its magnetization direction changes, depending on the magnetic filed that leaks from the medium. The second ferromagnetic layer has an approximately 0.5 to 5 nm in thickness, and its magnetization direction is generally fixed. The barrier layer is interposed between the first ferromagnetic layer and the second ferromagnetic layer, and has an approximately 0.5 to 1 nm in thickness. The TMR film has a higher sensitivity than the GMR film, though the TMR film has a higher element resistance than the GMR film. Thus, the TMR film is considered to be promising for achieving the higher recording density of the magnetic recording and reproducing apparatus.

In the magnetic recording and reproducing apparatus, by applying the sensing current to these magnetoresistive films described above, an electrical resistance change of the magnetoresistive film is detected as an output (voltage) signal.

In the case of the element that uses the GMR film (hereinafter referred to as a GMR element), a current applying direction is comparatively free; The GMR element of a type where current is applied in the plane of the GMR film has been primarily adopted. For applying current in the plane of the GMR film, there are provided two methods: one is a horizontal current application method where current is passed in a track width direction, and the other is a vertical current application method where current is passed in an element height direction perpendicular to the track width direction. In magnetic disk apparatuses that require a higher sensitivity, almost all magnetic heads adopt the horizontal current application method of passing current in the track width direction. In the case of the vertical current application method where current is passed in the element height direction, there is a need to dispose one of the leads on the side of an air bearing surface. Thus, a sensor unit around the air bearing surface where the sensitivity is the highest cannot be utilized successfully as an output unit, so that required sensitivity cannot be obtained. Accordingly, as a most dominant trend, the leads are disposed horizontally at both trackwidth edges of the GMR film.

However, in the method of applying current in the plane of the GMR film, as a shield-to-shield spacing is narrowed to adapt to the higher recording density of the magnetic recording and reproducing apparatus in the future, insulation between one or both of the shield layers and the magnetoresistive film or insulation between one or both of the shield layers or the leads electrically coupled to the magnetoresistive film is broken due to electrostatic discharge damage or the like. Thus, it becomes more likely that a substantial reduction in an amplitude of a read signal (to almost zero in many cases) or an increase in noise occurs, which leads to a malfunction of the magnetic disk device and a reduction in a magnetic head yield. In order to solve this problem, a CPP (current perpendicular to the plane) mode is proposed. In this method, a pair of the leads is disposed above and below the GMR film so that the sensing current is applied to a film thickness direction of the GMR film.

In this case, the shield layers can also serve as the leads, so that it becomes unnecessary to worry about insulation between one or both of the shield layers and the GMR film, or insulation between one or both of the shield layers and the leads. Further, the CPP mode could increase a magnetoresistive ratio of the GMR film. Accordingly, a CPP-GMR film, together with the TMR film, is considered to be a promising candidate for realizing next-generation high sensitivity magnetic heads.

In the case of the element that uses the TMR film (hereinafter referred to as a TMR element), it is necessary to apply current in the film thickness direction of the barrier layer. Thus, the leads are disposed above and below the TMR film. In this case, one soft magnetic metal can serve as a material for the leads and the shield layer. The TMR element is also one of CPP sensors, so that it is suitable for achieving the narrower shield-to-shield spacing in the future.

In order to reduce a positional deviation between a write position and the magnetoresistive film for a read operation and achieve a higher density of information to be recorded in the magnetic recording and reproducing apparatuses, the magnetic head with their write and read elements stacked on an identical substrate is often employed. In such an integral-type magnetic head, in order to ensure stability and reduce noise during the read operation, a layer of a nonmagnetic film with a submicron film thickness, formed of a material such as alumina, is often inserted between the read and write elements, thereby magnetically separating the read and write elements.

Magnetic separation between the read and write elements in the integral-type magnetic head, however, is not complete. Accordingly, in order to prevent malfunctions of the magnetic recording and reproducing apparatus, the magnetic head has a structure that includes a domain stabilization layer for maintaining the first ferromagnetic layer constituting the magnetoresistive film in a single domain structure state. This is because, even if the domain structure of the first ferromagnetic layer has been disturbed by an influence of the write element, the domain structure of the first ferromagnetic layer can be restored to the single domain structure again due to an effect of the magnetic stabilization layer. When the first ferromagnetic layer is not of the signal domain structure, the amplitude and a shape of a read output waveform change for each write operation, so that the magnetic recording and reproducing apparatus does not operate normally.

It is known that a pair of domain stabilization layers formed of a permanent magnet is disposed at both track-width edges of the magnetoresistive film (refer to JP-A-3-125311, for example). In this structure, the first ferromagnetic layer is induced to be in the single domain structure by a magnetic field generated from permanent magnet layers. Use of a multilayer film constituted by ferromagnetic and antiferromagnetic films instead of the permanent magnet layers is also proposed (refer to JP-A-7-57223, for example).

Further, when the magnetoresistive film is the TMR film, there is proposed a structure in which the domain stabilization layer formed of the permanent magnet is stacked on the TMR film (refer to JP-A-11-259824, for example). Still further, there is proposed a structure in which the domain stabilization layer constituted by a multilayer film of the ferromagnetic film and the antiferromagnetic film is stacked on the magnetoresistive film (refer to U.S. Pat. No. 6,023,395, for example).

In order to achieve the higher density of information to be recorded in the magnetic recording and reproducing apparatus, it is necessary to narrow a magnetic track width of the write and read elements of the magnetic head as well as to narrow the shield-to-shield spacing. This is because, by narrowing the shield-to-shield spacing, information can be recorded and reproduced with a high linear recording density. This is also because, by narrowing the track width, information can be recorded and reproduced with a high track density. For achieving an object of narrowing the track width, the distance between the poles of the write element has been primarily narrowed, and the width of the magnetoresistive film and a lead-to-lead spacing have also been narrowed, hitherto.

Further, in order to reduce a crosstalk component in a magnetoresistive-type read element, thereby improving an S/N ratio of the read signal, there is provided a method in which the spacing between the magnetic shield layers in portions with no magnetoresistive film interposed therebetween is reduced to be a half of or narrower than the spacing between the magnetic shield layers in a portion with the magnetoresistive film (Refer to JP-A-6-267027, for example). It is noted in this literature that, by adopting this structure, the crosstalk component of approximately −25 dB in magnitude, resulting from magnetic induction, sensed over a wide range of an entire shield width (typically about 10 to 100 μm in the case of a current magnetic head) can be reduced to a small level of approximately −30 dB. Thus, this structure is described to be effective for improving the S/N ratio.

As described above, for achieving the narrow track width of the read element, the size of the element has been reduced. However, when the magnetic track width of the read element is to be reduced to be less than approximately 100 nm so as to realize the magnetic recording and reproducing apparatus having the areal density exceeding 100 gigabits per square inch, inventors of the present invention have found that, even if the element size is reduced, the magnetic track width is not reduced correspondingly. Accordingly, the inventors have found that the element size needs to be reduced to be considerably smaller than a targeted magnetic track width.

When the width of the magnetoresistive film was set to 100 nm, the shield-to-shield spacing was set to 60 nm, and a magnetic head-to-medium spacing was set to 15 nm, assuming the areal density on the order of 100 gigabits per square inch, for example, a magnetic read track width was approximately 150 nm. Herein the magnetic track width was defined to be the width of locations where an off-track characteristic or a sensitivity distribution of a read head measured by using a signal recorded in a minute recording track becomes 20% (−14 dB) of a maximum output. The sensitivity distribution in this case roughly takes the shape like in a Gaussian distribution.

A difference between the magnetic read track width and the width of the magnetoresistive film is referred to as a side reading. In this case, a large side reading of 50 nm or 50% of the element size was observed. As a result of fabricating heads of various sizes and measuring the off-track characteristic under various conditions, the inventors of the present invention have found that an amount of the side reading is approximately equal to a value obtained by adding the head-to-medium spacing to a half of the shield-to-shield spacing.

In the case where the shield-to-shield spacing is 60 nm and the magnetic head-to-medium spacing is 15 nm, a theoretical side reading becomes as large as approximately 45 nm. Thus, it is found that, in order to obtain the magnetic track width of 100 nm, there is a need to reduce the element size to a minute size of approximately 55 nm. The side reading in this case is approximately 100% of the element size, which is a large value. In a semiconductor industry that has driven a minute pattern formation technique, a technique of mass producing patterns of less than 100 nm has currently been under development. Even with this most-advanced technique, however, it is very difficult to mass produce heads with the track width on the order of 50 nm. In order to realize the magnetic track width on the order of 100 nm, another breakthrough technique is required. Further, the side reading of approximately 45 nm is present in the above-mentioned case, so that it is considered to be almost impossible to realize the magnetic track width equal to or less than 50 nm.

In JP-A-6-267027, for example, there is proposed the method in which the spacing between the magnetic upper and lower shield layers in portions with no magnetoresistive film interposed therebeween is reduced to be a half of or narrower than the spacing between the magnetic upper and lower shield layers in a portion with the magnetoresistive element interposed therebetween. However, the object of the invention described in JP-A-6-267027 is not to provide the magnetic head suitable for a narrow track width, but to improve the S/N ratio by reducing crosstalk noise detected in a wide range over the shield width, as clear from FIG. 2 listed in JP-A-2-57223. As clear from FIG. 2, the magnitude of the crosstalk noise is substantially constant in a width direction of the entire shield layers, which is equivalent to so-called background noise. Accordingly, it is never implied that this crosstalk noise would become a serious problem when the track width of the read element has been narrowed. Hence, the magnetic track width on the order of 100 nm cannot be achieved under current circumstances.

For confirmation, from IEEE Transactions on Magnetics, 1994, vol. 30, pp. 303–308, the size of the read head having been studied at that time will be examined, and a rate of the side reading obtained at that time will be reviewed. According to this paper, the width of the magnetoresistive film was 4000 nm, the shield-to-shield spacing was 420 nm, and the magnetic head-to-medium spacing was 105 nm. The amount of the side reading in this condition is found to be 315 nm in view of a relation described above. This side reading corresponds to as little as 8% of the element size. It shows that, in the case of the magnetic track width on the order of several thousand nanometers, the side reading scarcely became a problem. In other words, the rate of the side reading was small at that time, so that the magnetic track width could be determined almost solely from the element size.

However, as described above, when the track width has been narrowed to be of the order to 100 nm, the narrower the track width becomes, the higher the rate of the side reading becomes. Thus, even if the element size is reduced, the magnetic track width is not reduced so much. Consequently, it has become apparent that, under the current circumstances, realization of the head that accommodates narrower tracks becomes difficult. Further, even if an extremely minute element size was realized with a large side reading and a narrower magnetic track width was then obtained as a result, only an extremely small output can be obtained. It is because the output of the head is roughly proportional to the element size. Thus, it is readily anticipated that the magnetic recording and reproducing apparatus does not operate normally due to insufficient sensitivity.

SUMMARY OF THE INVENTION

An object of the present invention is therefore to provide a magnetic recording head which accommodates narrower tracks and which can be readily fabricated, and to realize a magnetic recording and reproducing apparatus with an areal density exceeding 100 gigabits per square inch. In order to realize the magnetic recording head according to the present invention, a side reading by the magnetic recording head in a narrow track width of the order to 100 nm is made smaller than a theoretical value determined from a shield-to-shield spacing and a magnetic spacing. It is a further object of the present invention to provide a magnetic recording head with a narrow track width and a high sensitivity by limiting a side reading to be smaller than the theoretical value, and to provide a magnetic recording and reproducing apparatus that scarcely malfunctions even if its recording density is high.

In order to achieve the above object, a magnetic head according to the present invention includes a magnetoresistive film formed between a pair of magnetic upper and lower shield layers and a pair of leads electrically coupled to the magnetoresistive film. A pair of magnetic side shield layers is formed on both sides of the magnetoresistive film in a track width direction. By optimally setting a spacing between each magnetic side layer and an adjacent trackwidth edge of the magnetoresistive film, the side reading by a read element due to the magnetoresistive film is made smaller than the theoretical value defined by the shield-to-shield spacing and the magnetic spacing, and a magnetic read track width is made narrower than a width determined by a theoretical side reading and an element size.

Preferably, the spacing between each magnetic side shield layer and the adjacent trackwidth edge of the magnetoresistive film, in particular, is formed to be smaller than twice the spacing between the pair of the magnetic upper and lower shield layers. More preferably, the spacing between each magnetic side shield layer and the adjacent trackwidth edge of the magnetoresistive film is formed to be smaller than the spacing between the pair of the magnetic upper and lower shield layers.

A magnetic head according to the present invention includes a magnetoresistive film formed between a pair of magnetic upper and lower shield layers and a pair of leads electrically coupled to the magnetoresistive film. A pair of magnetic side shield layers is formed on both sides of the magnetoresistive film in a track width direction. By optimally setting a spacing between each magnetic side layer and an adjacent trackwidth edge of the magnetoresistive film, a side reading by a read element due to the magnetoresistive film is made smaller than a theoretical value defined by a shield-to-shield spacing and a magnetic spacing, and a magnetic read track width is made smaller than a width determined by a theoretical side reading and an element size.

According to one aspect of the present invention, the spacing between each magnetic side shield layer and the adjacent trackwidth edge of the magnetoresistive film is formed to be smaller than twice the spacing between the pair of the magnetic upper and lower shield layers. More preferably, the spacing between each magnetic side shield layer and the adjacent trackwidth edge of the magnetoresistive film is formed to be smaller than the spacing between the pair of the magnetic upper and lower shield layers.

It is implied in JP-A-6-267027, for example, that portions of the magnetic upper shield layer are present in extended lines of the trackwidth edges of the magnetoresistive film. It is never implied, however, that the side reading can be reduced more than a hitherto obtained value by extremely bringing the portions of the magnetic shield layer closer to both trackwidth edges of the magnetoresistive film. In order to achieve the object of the invention described in JP-A-6-267027, a spacing between the magnetic upper and lower layers in portions without the magnetoresistive film should be reduced to half or less of the spacing between the magnetic upper and lower shield layers in a portion with the magnetoresistive film; there is no need for the portions of the magnetic upper shield layer to be excessively brought closer to both of the trackwidth edges of the magnetoresistive film.

The side shield layers described above, which are the portions of the magnetic upper shield layer formed on both sides of the magnetoresistive film, may be fabricated separately. For simplification of a fabrication process, however, by optimizing a shape of the magnetic upper shield layer in its outer portions in the track width direction without the magnetoresistive film for the spacing between the magnetic upper and lower shield layers in the portion with the magnetoresistive film, and forming the portions of the magnetic upper shield layer to be also located on both sides of the magnetoresistive film, the same effect can be obtained.

As described above, the side shield layers are formed to be very close to both sides of the magnetoresistive film in the track width direction. More specifically, it is effective to make the magnetoresistive film to be constituted by a multilayer film formed by stacking a first ferromagnetic layer, a nonmagnetic layer, a second ferromagnetic layer, and an antiferromagnetic layer one atop another in this stated order, or stacking the antiferromagnetic layer, second ferromagnetic layer, nonmagnetic layer, and first ferromagnetic layer one atop another in this stated order, and to form a pair of the side shield layers to be located on both sides of the first ferromagnetic layer, or very close to the extended lines of the first ferromagnetic layer in the track width direction.

An object of the present invention is to realize a magnetic recording and reproducing apparatus with an areal density exceeding 100 gigabits per square inch. For doing so, the shield-to-shield spacing should be 100 nm or less. Accordingly, it is necessary to make the spacing between each of the magnetic side shield layers and the adjacent trackwidth edge of the magnetoresistive film to be 200 nm or less. In the case of a GMR film of a horizontal current application type where current is applied in the plane of the film, which has been mainly employed hitherto, leads with a width of approximately 10 μm (10,000 nm) are present on both sides of the GMR film. On the other hand, domain stabilization layers formed of a permanent magnet are also present on both sides of the trackwidth edges of the GMR film. Thus, it is extremely difficult to dispose the side shield layers at effective positions on both sides of the GMR film and within 200 nm apart from the GMR film.

Thus, in order to remove the leads on both sides of the magnetoresistive film, it is desirable to employ a TMP film of a CPP mode or a CPP-GMR film. It is because, if the CPP mode is applied, the leads can be stacked on the magnetoresistive film.

Further, in order to remove the domain stabilization layers on both sides of the magnetoresistive film, it is desirable to stack the domain stabilization layer on the magnetoresistive film.

In order to restrain variations in an amplitude and the shape of a read output waveform so as to stably operate the magnetic head including the side shield layers, it is desirable to stabilize a domain structure of the side shield layer: since the side shield layers are far closer to the magnetoresistive film than ever, the magnetoresistive film is thereby affected more greatly by the side shield layers. As a result, if the domain structure of the side shield layer has been disturbed, a magnetic field generated from its magnetic wall greatly varies a magnetization state of the magnetoresistive film. A read output is thereby varied.

In order to stabilize the domain structures of the side shield layers, the side shield layer was constituted by a multilayer film formed by stacking the ferromagnetic layer, nonmagnetic layer, and ferromagnetic layer one atop another in this stated order, or stacking the ferromagnetic layer and antiferromagnetic layer one atop another, or stacking the ferromagnetic layer, nonmagnetic layer, and antiferromagnetic layer one atop another in this stated order.

In order to realize a magnetic recording and reproducing apparatus according to the present invention, which scarcely malfunctions while having a high recording density, the magnetic recording and reproducing apparatus was configured to include a magnetic head having a write element including a pair of magnetic cores and a coil, a read element including the magnetic side shield layers, and write and read operation control means for recording and reproducing information based on input and output signals from the magnetic head.

Further, a narrower write core width in an air bearing surface of the magnetic head was formed to be the same as or wider than a magnetic read track width of the read element. Specifically, the narrower write core width was formed to the same as or wider than a value obtained by adding a magnetic spacing d between the magnetic head and a medium, and a half of a spacing x between each side shield layer and the magnetoresistive film to a width Twr of the magnetoresistive film, or Twr+d+x/2. This arrangement is made to make a magnetic write track width of a signal recorded on a medium to be wider than the magnetic read track width: if the magnetic write track width is narrow, probability of malfunction of the apparatus becomes high because the read output is reduced or a signal component at an adjacent track is read due to a head positioning error or the like.

Other objects, features and advantages of the invention will become apparent from the following description of the embodiments of the invention taken in conjunction with the accompanying drawings.

DETAILED DESCRIPTION OF THE EMBODIMENTS

Now, specific embodiments of a magnetic head and a magnetic recording and reproducing apparatus according to the present invention will be described in detail.

First Embodiment

Figure 1:
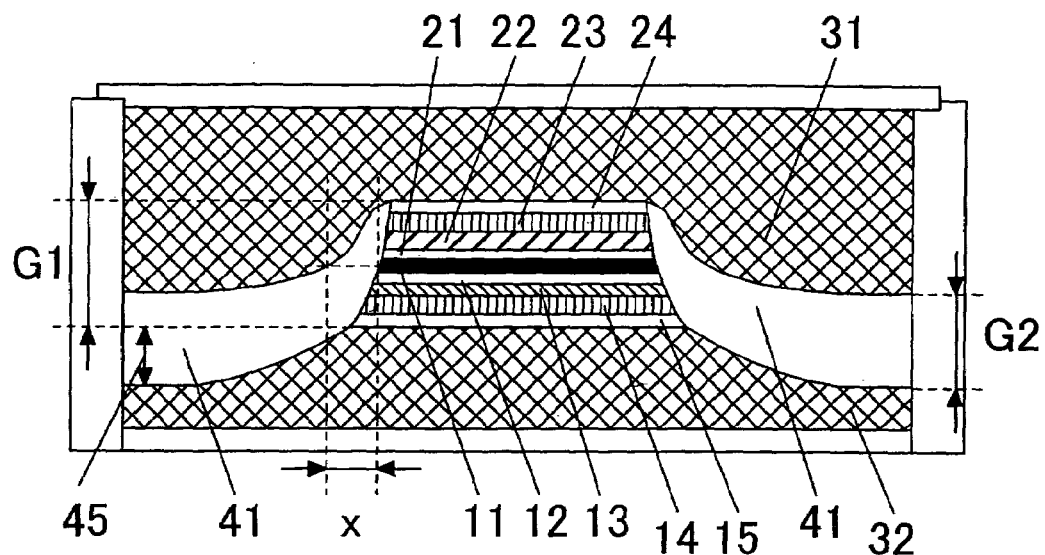
FIG. 1 is a schematic diagram showing an enlargement of a portion around a magnetoresistive film in an air bearing surface of a magnetic head according to a first embodiment of the present invention.

FIG. 1 is a diagram showing an enlargement of a portion around a magnetoresistive film of a read element of a magnetic head according to a first embodiment of the present invention. An overview of the magnetic head will be described below with reference to FIGS. 7 and 8.

A lower shield layer 32 formed of $Ni_{80}Fe_{20}$, with a thickness of 3 μm was formed on a substrate through a base alumina layer with a thickness of several μm, not shown. The lower shield layer 32 also serves as one of leads electrically coupled to the magnetoresistive film. A TMR film was formed on the lower shield layer 32 so that the TMMR film is electrically coupled to the lower shield film 32.

The TMR film is constituted by an electrically conductive underlayer 15 with a thickness of 9 nm, an antiferromagnetic layer 14 with a thickness of 15 nm, formed of $Pt_{50}Mn_{50}$, a second ferromagnetic layer 13 constituted by stacking a $Co_{70}Fe_{30}$ film with a thickness of 2 nm, a Ru film with a thickness of 1 nm, and a $Co_{70}Fe_{30}$ film with a thickness of 1 nm, a barrier layer 12 with a thickness of 1 nm, formed of alumina, and a first ferromagnetic layer 11 with a thickness of 2 nm, formed of $Co_{90}Fe_{10}$, all of which were stacked one atop another over the substrate in this stated order.

In this embodiment, the TMR film was employed as the magnetoresistive film, but in place of the TMR film, a CPP-GMR film may also be employed. In this case, a Cu layer with a thickness of approximately 2 nm should be used instead of the barrier layer 12. The antiferromagnetic layer 14 can be omitted in some cases.

In order to maintain the first ferromagnetic layer 11 in the single domain structure state, a domain stabilization layer is formed over the first ferromagnetic layer 11 through a separation layer 21 constituted by a multilayer film formed with a 1 nm-thick Cu layer and a 1 nm-thick Ru layer. The domain stabilization layer is formed by stacking a 15 nm-thick antiferromagnetic layer 23 made of such a material as $Pt_{50}Mn_{50}$ on a 2 nm-thick ferromagnetic layer 22 made of such a material as $Co_{70}Fe_{30}$. An electrically conductive cap layer 24 with a thickness of 10 nm was then stacked on the antiferromagnetic layer 23. By disposing the domain stabilization layer, even if the domain structure of the first ferromagnetic layer has been disturbed by an influence of a write element, the first ferromagnetic layer can be restored to the single domain structure again due to the effect of the domain stabilization layer.

The above-mentioned multilayer films such as the TMR film and the domain stabilization layer were patterned so that a width of the barrier layer 12 takes on a desired value. In this embodiment, the width of the barrier layer 12 was set to 100 nm. When performing patterning, a photoresist formed to have a predetermined width was disposed over above-mentioned multilayer films, and then, with this photoresist employed as a mask, a peripheral portion that becomes unnecessary was etched. At the time of etching, together with the peripheral portion, portions of an upper surface of the lower shield layer 32 were etched to an appropriate depth 45. In this embodiment, an amount of etching 45 was set to 30 nm. Then, before this mask was removed, an insulating gap layer 41 made of a material such as alumina or silicon oxide was formed. A thickness G2 in a flat portion of the gap layer 41 was set to 40 nm.

After the mask had been removed, a 2 µm-thick upper shield layer 31 made of $Ni_{80}Fe_{20}$ was stacked over the patterned multilayer films so as to be electrically coupled to the patterned multilayer films. The upper shield layer 31 also serves as the other one of the leads electrically coupled to the magnetoresistive film. A spacing G1 between the upper shield layer 31 and the lower shield layer 32 in a portion where the TMR film is present is 60 nm. Adjustment of the shield-to-shield spacing G1 should be primarily made by changing film thicknesses of the electrically conductive underlayer 15, antiferromagnetic layer 14, antiferromagnetic layer 23, or electrically conductive cap layer 24.

The upper shield layer 31 is formed over the insulating gap layer 41 with a thickness of 40 nm, formed on the portions of lower shield layer etched to a depth of 30 nm, as well as over the multilayer films with a thickness of 60 nm, constituted by the layers and the films such as the TMR film. Thus, the first ferromagnetic layer 11 constituting the TMR film is substantially covered by the upper shield layer 31. The upper shield layer 31 is present on both sides of the first ferromagnetic layer 11, or near extended lines of trackwidth edges of the first ferromagnetic layer 11. A distance x between the first ferromagnetic layer 11 and the upper shield layer 31 is approximately 20 nm. Accordingly, the distance x is formed to be narrower than the shield-to-shield spacing G1.

The magnetic head including side shield layers in this embodiment was flown with its magnetic spacing from a magnetic disk medium being 15 nm, and a write and read characteristic of the magnetic head was evaluated. Even if the width of the TMR film was as narrow as 100 nm, a high output of 1 mV or higher was obtained with a sensing current being of the order of 1 mA. Furthermore, a minute track with signals recorded thereon was formed on the medium, and a sensitivity distribution of the read element of the magnetic head was measured. When a maximum output was set to unity, and a magnetic track width was defined to be the track width at positions where 20% of the maximum output was obtained, the magnetic track width was approximately 125 nm. Accordingly, it was found that a side reading in this embodiment was 25 nm.

A magnetic head for comparison was fabricated and the write and read characteristic of the magnetic head was evaluated. In this magnetic head, the film thickness G2 in the flat portion of the insulating gap layer 41 was set to 60 nm. This is equal to the shield-to-shield spacing G1 in the portion between the upper and lower shields, where TMR film is interposed. Since the film thickness G2 equals to the shield-to-shield spacing G1, the upper shield layer 31 is not present on both sides of the first ferromagnetic layer 11. The output of the magnetic head was 1 mV or higher, which was substantially equal to the output of the magnetic head in this embodiment. The magnetic track width was approximately 145 nm, and the side reading was 45 nm, which was larger than the side reading of the magnetic head in this embodiment. Hence, in this embodiment, by making the side shield layers to be located closer to the side of the TMR film, the side reading could be reduced to about a half of a theoretical value defined by the shield-to-shield spacing and a magnetic gap, without compromising a high read output sensitivity.

Figure 2:
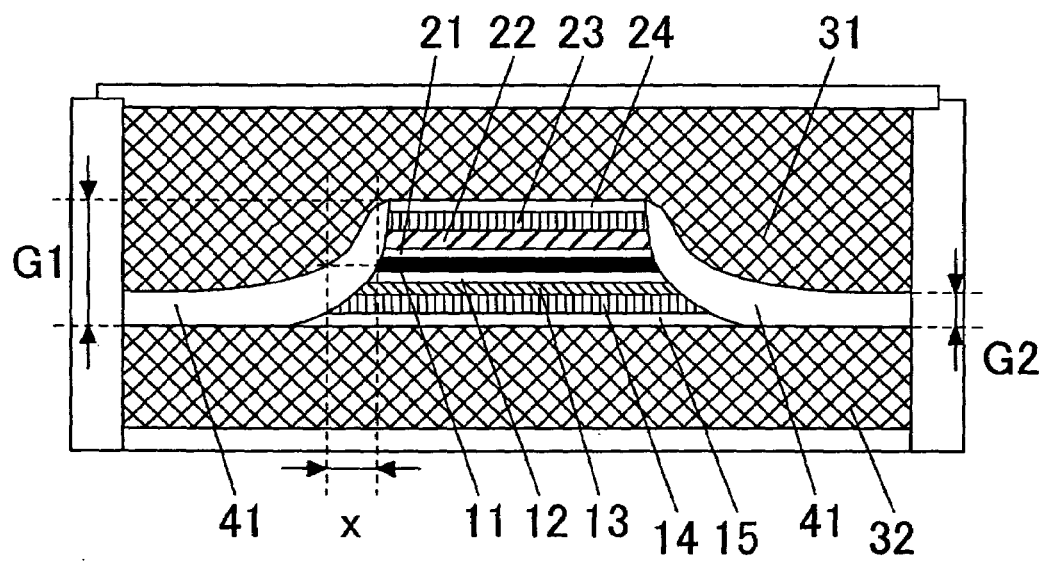
FIG. 2 is a schematic diagram showing an enlargement of a portion around the magnetoresistive film in an air bearing surface of the magnetic head according to the first embodiment of the present invention.

The foregoing description was directed to the magnetic head in the first embodiment, shown in FIG. 1. The amount of etching 45 of the lower shield layer 32 may be substantially zero. An embodiment in this case is shown in FIG. 2. The film thickness G2 of the insulating gap layer 41 in its flat portion was set to 20 nm so that portions of the upper shield layer 31 are located just by the sides of the first ferromagnetic layer 11. In this embodiment, the etching amount of the lower shield layer 32 can be made smaller than in an example in FIG. 1. Thus, a magnetic head fabrication process becomes more simplified. Further, the lower shield layer 32 has smaller elevational differences, so that the domain structure of the first ferromagnetic layer 11 becomes more stabilized. Stabilization of a read output waveform can be thereby achieved.

However, since the film thickness G2 of the insulating gap layer 41 is not etched so much, the insulating gap layer 41 becomes correspondingly thinner. Thus, it becomes more likely that insulation between the upper shield layer 31 and the lower shield layer 32, both of which also serve as a pair of the leads, is broken. In view of this, the amount of etching 45 should be set to a value in a range from zero to approximately 100 nm. Comprehensive determination should be made in view of reliability of the magnetic head and a cost of the magnetic head fabrication process.

Next, a flow for fabrication of a structure of the head shown in FIG. 1 will be outlined with reference to FIGS. 3A to 3F.

Figure 3A:
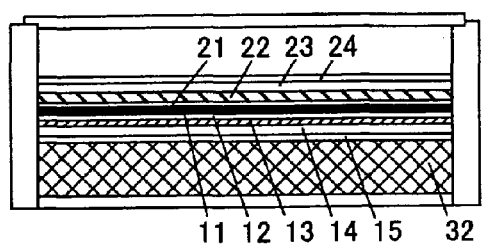
FIGS. 3A to 3F are schematic diagrams showing an overview of a fabrication process of the magnetic head according to the first embodiment.

At a step of FIG. 3A, the lower shield layer 32, electrically conductive underlayer 15, antiferromagnetic layer 14, second ferromagnetic layer 13, barrier layer 12, first ferromagnetic layer 11, separation layer 21, ferromagnetic layer 22, antiferromagnetic layer 23, and electrically conductive cap layer 24, all of which have the respective film thicknesses described above, were stacked one atop another, using the above-mentioned materials described above for the respective layers.

Figure 3D:
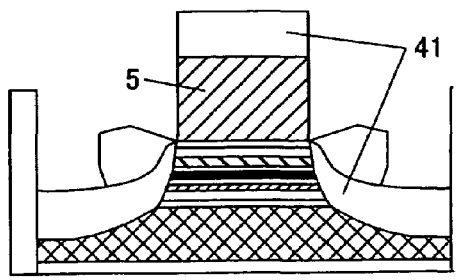
Figure 3B:
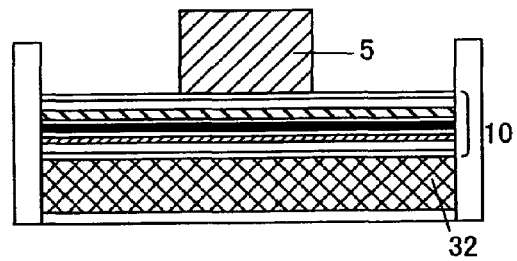

Then, at a step of FIG. 3B, a mask 5 having a given width (100 nm in this embodiment) was stacked on these layers. Incidentally, the electrically conductive underlayer 15, antiferromagnetic layer 14, second ferromagnetic layer 13, barrier layer 12, first ferromagnetic layer 11, separation layer 21, ferromagnetic layer 22, antiferromagnetic layer 23, and electrically conductive cap layer 24 are collectively referred to as a laminated film 10.

Figure 3E:
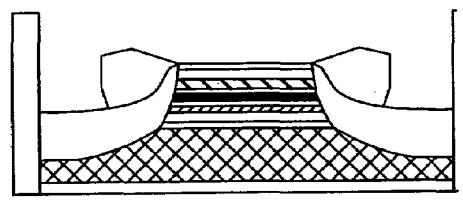
Figure 3C:
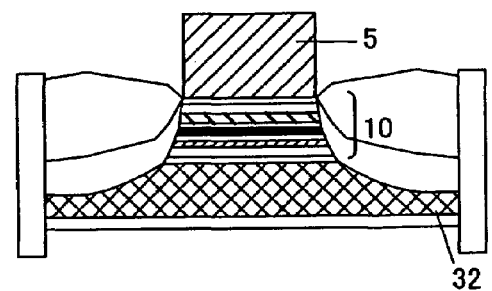

At a step of FIG. 3C, the multilayer film 10 and upper portions of the lower shield layer 32 were etched by ion milling or the like At a step of FIG. 3D, the insulating gap layer 41 was then deposited on the multilayer film 10 and the upper portions of the lower shield layer 32. The insulating gap layer 41 is deposited on the mask 5 as well as the multilayer film 10 and the lower shield layer 32.

At a step of FIG. 3E, the mask 5 was removed by a lift-off method or the like. The insulating gap layer 41 on the mask 5 is also removed simultaneously.

Figure 3F:
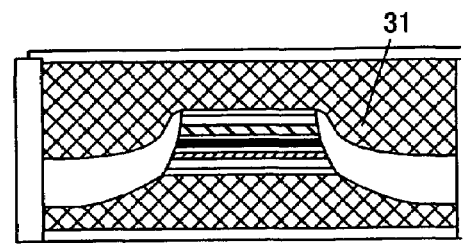

At a step of FIG. 3F, the upper shield layer 31 was deposited over the remainder of the insulating gap layer 41 and the multilayer film 10. A structure in FIG. 1 could be thereby obtained.

Figure 4:
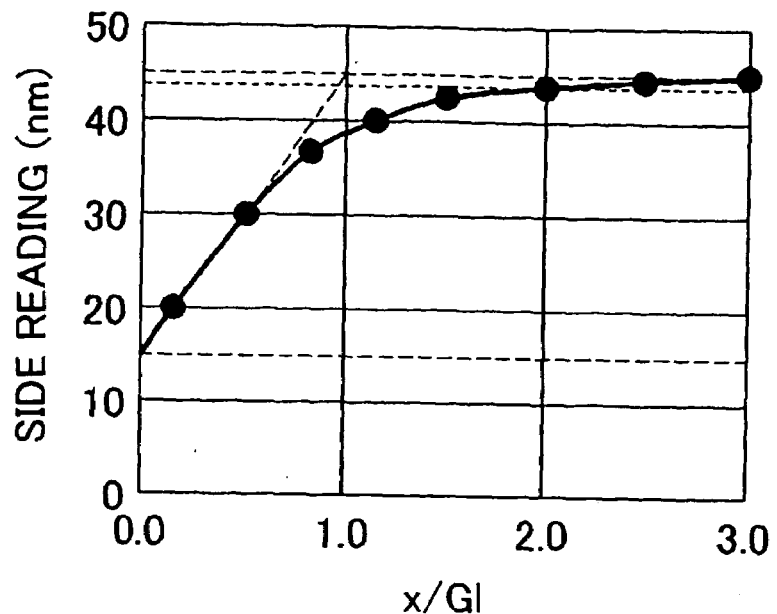
FIG. 4 is a characteristic diagram showing a relationship between a side reading and a spacing x between a side shield layer and the magnetoresistive film of the magnetic head according to the first embodiment of the present invention.

FIG. 4 shows a result of an analysis as to at which position in the track width direction it is effective to locate the side shield layers to reduce the side reading. FIG. 4 shows how the side reading varied with a change in the distance x between the first ferromagnetic layer 11 and the upper shield layer 31.

The distance x on a horizontal axis in FIG. 4 was normalized by G1. When the distance x was zero, the side reading was 15 nm. When the distance x was small, the side reading increased in proportion to the distance x. When the distance x became large, the side reading became gradually close to 45 nm. Accordingly, it is found that, by varying the distance x, the side reading changed by 30 nm. Approximately 5% of the amount of the change is measurable. It can be seen from FIG. 4 that, in order to reduce the side reading by not less than 1.5 nm, which is 5% of 30 nm, the distance x should be reduced to less than twice the shield-to-shield spacing G1. In other words, x/G1 should be made to be smaller than 2.0. Accordingly, the spacing x between each side shield layer and an adjacent trackwidth edge of the magnetoresistive film should be smaller than a value which is twice the shield-to-shield spacing G1 between the upper and lower shield layers.

Preferably, the distance x should be smaller than the shield-to-shield spacing G1, or x/G1 should be smaller than 1.0, in order to reduce the side reading. It can be seen from FIG. 4 that, if a tangent to a curve at a position where the distance x is around zero is extended, the side reading becomes 45 nm when x/G1 is 1.0. Accordingly, by reducing the distance x to be smaller than the shield-to-shield spacing G1, an effect of reducing the side reading can be more enhanced.

Figure 5:
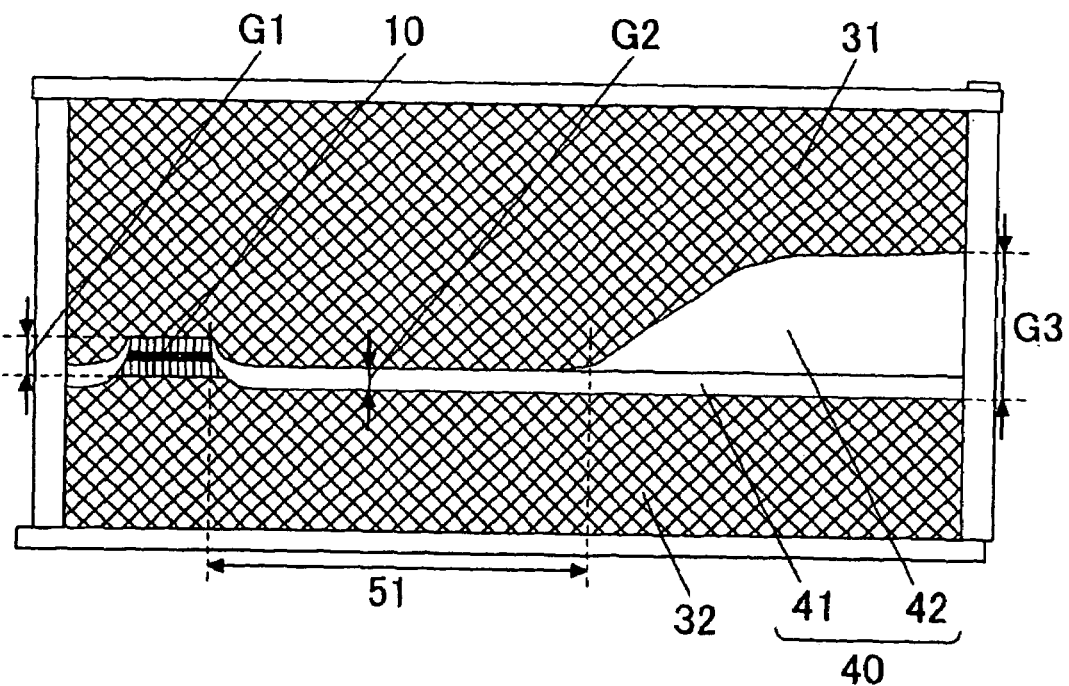
FIG. 5 is a schematic diagram showing an enlargement of a portion around the magnetoresistive film in an air bearing surface of the magnetic head according to the first embodiment of the present invention.

A shape of the upper shield layer 31 will further be described with reference to FIG. 5. Like FIGS. 1 and 2, FIG. 5 is a plan view of a read element of the magnetic head according to this embodiment, seen from an air bearing surface. The upper shield layer 31 and the lower shield layer 32 also serve as the leads for the laminated film 10. The width of the upper shield layer 31 was set to approximately 30 μm, while the width of the lower shield layer 32 was set to approximately 35 μm. The shield-to-shield spacing G2 on both sides of the magnetoresistive film 10 is from 20 to 40 nm, which is extremely narrow. Thus, if the entire portions where the upper shield layer 31 and the lower shield layer 32 face to each other have the spacing of this size, insulation of the insulating gap layer 41 might be broken at these portions.

If the insulation has been broken, most of the sensing current does not pass through the magnetoresistive film 10, and is shorted at these portions. Thus, the read output is considerably reduced, so that the magnetic head in this embodiment does not operate normally. Further, since the upper shield layer 31 and the lower shield layer 32, both of which are formed of a metal film, face to each other with the insulating gap layer 41 with a thickness of approximately 20 to 40 nm interposed therebetween. Thus, this spacing portion electrically serves as a condenser. If the capacity of the condenser is large, a low-pass filter is formed, so that a high-frequency characteristic of the read output deteriorates.

In order to reduce probability of insulation breakage and to maintain the capacity of the condenser to be low, the spacing between the upper and lower shield layers was widened in their outer portions to be set to G3. The thickness of the spacing G3 may be selected appropriately in a range from 100 nm to 1000 nm. In order to increase the spacing G2 to G3, gap layers 42 formed of a material such as alumina was stacked on the insulating gap layer 41 in the outer portions. Then, by forming the upper shield layer 31 over the gap layer 42, the desired shield spacing G3 larger than G2 can be obtained.

A width 51 of each of the portions where the upper and lower shield layers face to each other with the spacing G2 should be from 100 nm to 10 μm, and further, preferably is several μm or less. The narrower the width 51, the lower the probability of the insulation breakage and the capacity can be made. If the width 51 is set to be too narrow, fabrication of the magnetic head becomes difficult. Further, permeability is reduced, so that in some cases, the upper shield layer 31 and the lower shield layer 32 do not satisfactorily function as side shields.

Figure 6:
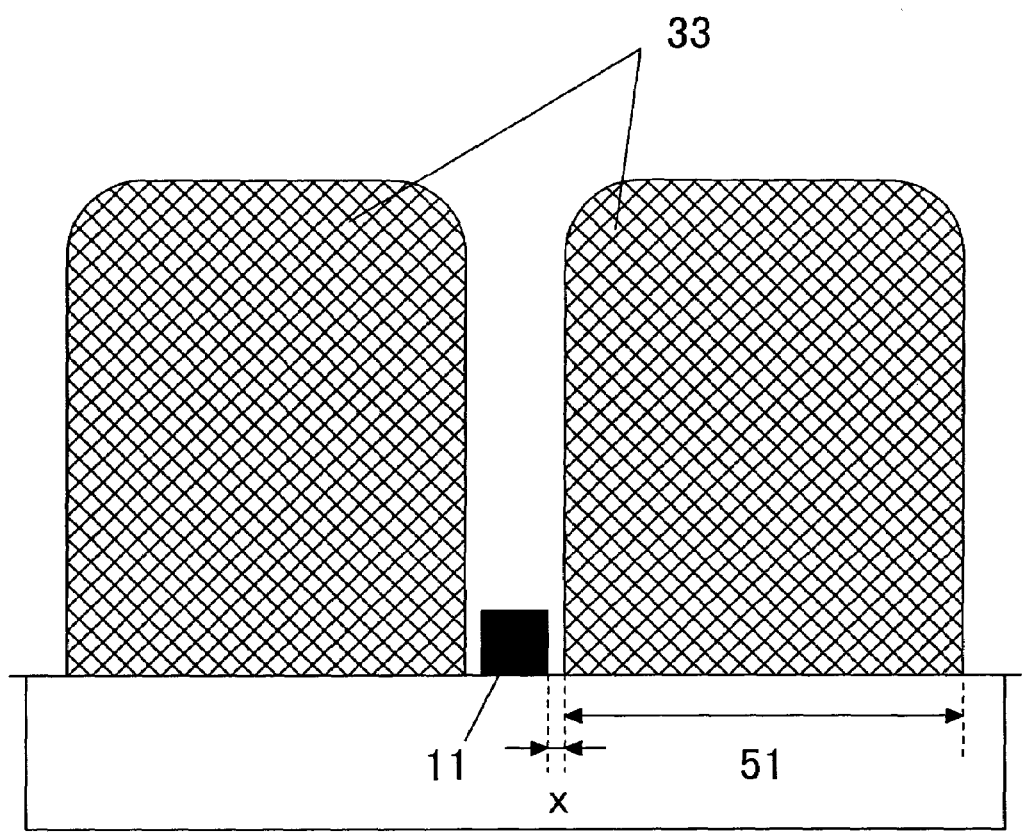
FIG. 6 is a plan view of the magnetic head according to the first embodiment of the present invention.

FIG. 6 shows a plan view of a surface of the magnetic head in this embodiment, where the first ferromagnetic layer 11 is present. On both sides of the first ferromagnetic layer 11 with the distance x apart from the first ferromagnetic layer 11, the side shield layers 33 which are parts of the upper shield layers 31 with the width 51 are present. Since a pair of the leads and the domain stabilization layer was stacked over the first ferromagnetic layer 11, they are not present in a plane shown in FIG. 6. Accordingly, the distance x could be set to be 20 nm, which was an extremely small value.

Figure 7:
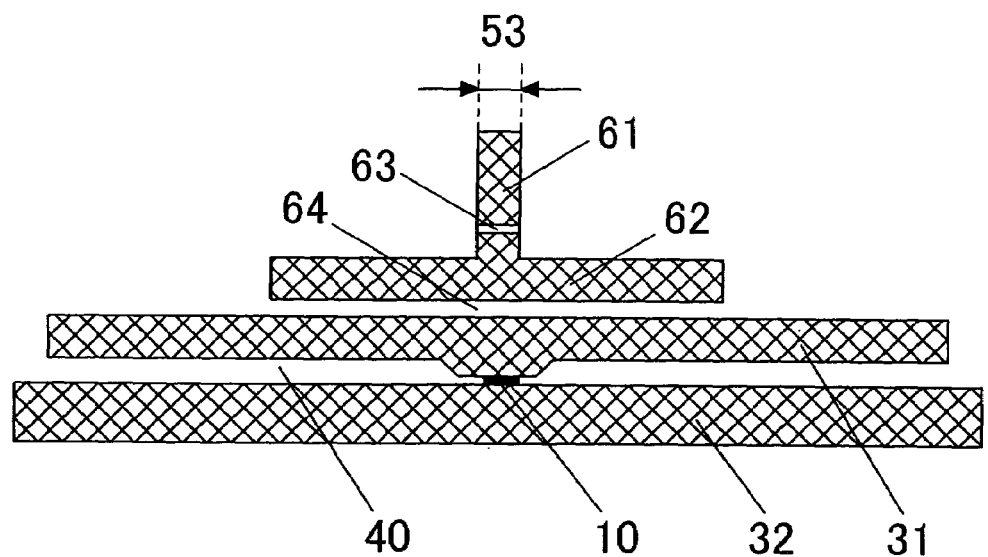
FIG. 7 is a schematic diagram showing the entire air bearing surface of the magnetic head according to the first embodiment.

FIG. 7 shows an overall structure of the magnetic head in this embodiment, seen from the air bearing surface. A longitudinal write element was employed for the write element. As seen from the substrate not shown, the lower shield layer 32, magnetoresistive film 10, upper shield layer 31 are formed in this stated order. As described above, a gap layer 40 formed by stacking of the insulating gap layer 41 and the gap layer 42 was formed between the upper shield layer 31 and the lower shield layer 32 in flat portions far apart from the region where the magnetoresistive film 10 was formed.

A nonmagnetic separation layer 64 with a thickness of 500 nm, made of alumina was formed on the read element. Then, a lower core 62 with a thickness of 2 μm, made of an alloy such as a Co—Fe—Ni alloy was formed to stack the write element on the non-magnetic separation layer 64. The lower core 62 has a convex portion at its top surface. This convex portion was made of a Fe—Co alloy with a saturation flux density of approximately 2.4 tesla. A 100 nm-thick nonmagnetic gap layer 63 made of alumina is formed on the convex portion, and an upper core 61 formed by stacking of films formed with an 1 μm-thick Fe—Co alloy layer and a 2 μm-thick Co—Fe—Ni alloy layer was formed on the nonmagnetic gap layer 63. A write core width 53 of a portion where the upper core 61 faces the lower core 62 was set to 150 nm.

Figure 8:
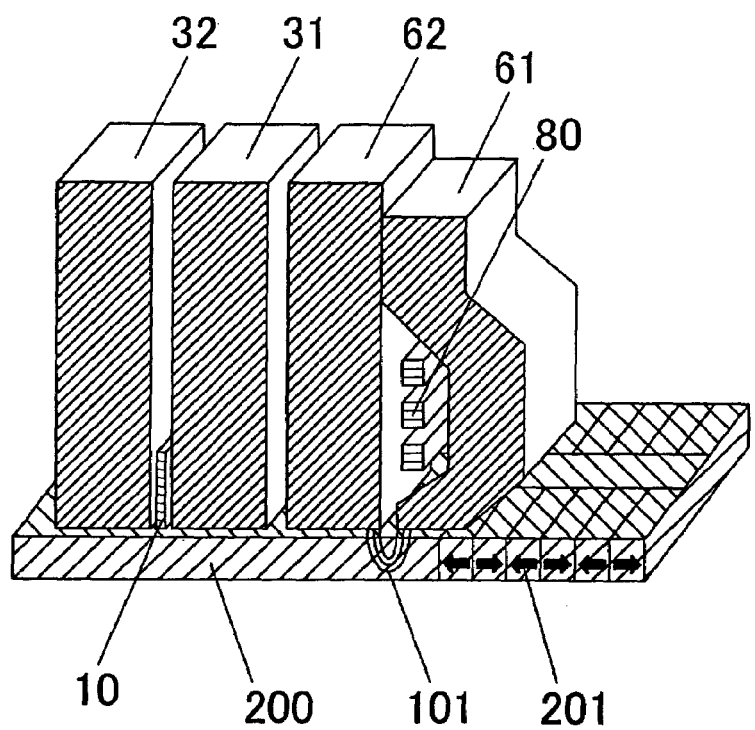
FIG. 8 is a perspective sectional view of the magnetic head according to the first embodiment of the present invention.

FIG. 8 shows a schematic perspective section of the magnetic head in this embodiment. The section in FIG. 8 corresponds to a section through a center line in FIG. 7. A coil 80 for generating a magnetic flux is formed between the upper core 61 and the lower core 62. By passing a current for writing a desired pattern through the coil, a write field 101 is generated in a recording gap between the upper core 61 and the lower core 62. The write field is then applied to a recording medium 200 in the desired pattern, and recorded magnetization 201 having a desired magnetization direction is written onto the recording medium 200. By detecting a magnetic field leaked from the recorded magnetization 201 through the magnetoresistive film 10, recorded information is reproduced.

As described above, in this magnetic head, the write element is stacked on the read element on the identical substrate to be integral with the read element. They are thereby close to each other, so that a write field generated from the write element affects the read element, thereby causing variations in the read output waveform and the read output. In this embodiment, as shown in FIG. 1, the domain stabilization layer constituted by the ferromagnetic layer 22 and the antiferromagnetic layer 23 is stacked on the magnetoresistive film. Thus, even if a write and read operation was repeated 1000 times, a variation range of the read output was within 10%, which was a sufficiently low value in view of practical applications. If the domain stabilization layer was omitted, the read output varied greatly; the read output became half of a reference value, or twice the reference value. Accordingly, it was confirmed that due to the effect of the domain stabilization layer, a stabilized operation could be obtained.

In order to further reduce variations in the read output, it is effective to stabilize the domain structure of the upper shield layer 31. It is because, in the magnetic head in this embodiment, the upper shield layer 31 is far more close to the magnetoresistive film 10 than ever, so that the magnetoresistive film 10 is thereby more greatly affected by the side shield layers. Accordingly, when a write field generated from the write element has affected the upper shield layer 31 to disturb the domain structure of the upper shield layer 31, a magnetic field generated from the magnetic wall of the domain structure of the upper shield layer 31 causes a magnetization state of the magnetoresistive film 10 to vary greatly. The read output is thereby varied.

In order to stabilize the domain structure of the upper shield layer 31, the upper shield layer 31 should be of a structure with a multilayer film formed by stacking the ferromagnetic layer, nonmagnetic layer, and ferromagnetic layer one atop another in this stated order. Alternatively, the upper shield layer 31 should be of a structure with a multilayer film formed by stacking the ferromagnetic layer and the antiferromagnetic layer one atop another. Still alternatively, the upper shield layer 31 should be of a structure with a multilayer film formed by stacking the ferromagnetic layer, nonmagnetic layer, and antiferromagnetic layer one atop another in this stated order.

Figure 9:
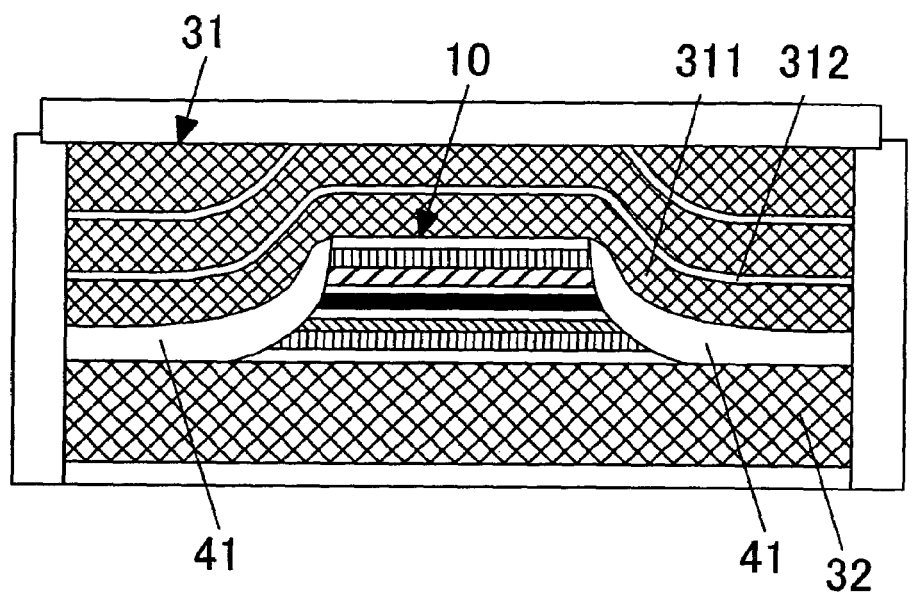
FIG. 9 is a schematic diagram showing an enlargement of a portion around the magnetoresistive film in an air bearing surface of the magnetic head according to the first embodiment.

FIG. 9 shows a case where the upper shield layer 31 was constituted by a multilayer film formed by stacking the ferromagnetic layer, nonmagnetic layer, and ferromagnetic layer one atop another in this stated order. The upper shield layer 31 was formed by stacking a 10 nm-thick ferromagnetic layer 311 made of $Ni_{80}Fe_{20}$ and a 2 nm-thick nonmagnetic layer 312 made of $Ni_{80}Cr_{20}$ alternately. The entire upper shield layer 31 may be constituted by the multilayer film described above. However, for more simplification of the fabrication process of the magnetic head, only a lower surface portion of the upper shield layer 31 with a thickness of approximately 100 nm close to the magnetoresistive film can be constituted by the multilayer film, and a remainder portion can be constituted by a ferromagnetic layer made of such a material as $Ni_{80}Fe_{20}$, for example. The nonmagnetic layer 312 can also be formed of Ta. $Ni_{80}Fe_{20}$ and Ta are effective for improving a crystal orientation and a soft magnetic characteristic of the ferromagnetic film formed on the nonmagnetic layer. Accordingly, these materials are optimal for use in the nonmagnetic layer 312.

By employing the multilayer film of the ferromagnetic layer 311 and the nonmagnetic layer 312 for the upper shield layer 31 close to the write element, the domain structures of the ferromagnetic films are bifurcated to a small extent. Further, since magnetization of the ferromagnetic layers sandwiching the nonmagnetic layer is coupled to each other magnetostatically, the domain structures of the ferromagnetic layers become stabilized. Thus, the magnetization state of the magnetoresistive film 10 will not be disturbed. The read output can be thereby stabilized.

The nonmagnetic layer 312 can be made of Ir, Ru, Rh, or Cu, having a thickness from one to several nanometers. These metals, if employed for an intermediate layer in the multilayer film, have an effect of mutually coupling magnetization of the ferromagnetic layers 311 in an antiparallel direction. Thus, the domain structures of the ferromagnetic layers 311 can be more stabilized. However, if the effect of coupling magnetization in the antiparallel direction is too strong, the permeability of the shield layers is reduced. The permeability should be 100 or higher, preferably 500 or higher. The permeability can be adjusted by changing the film thickness of the nonmagnetic layer 312.

Figure 10:
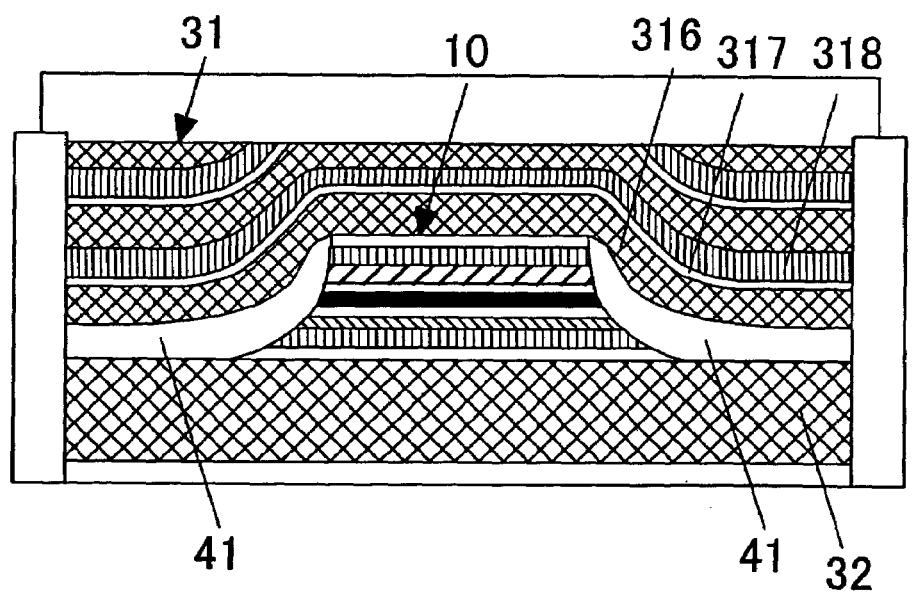
FIG. 10 is a schematic diagram showing an enlargement of a portion around the magnetoresistive film in an air bearing surface of the magnetic head according to the first embodiment.

FIG. 10 shows an example where the upper shield layer 31 was constituted by a multilayer film formed by stacking the ferromagnetic layer, nonmagnetic layer, and antiferromagnetic layer one atop another in this stated order. The upper shield layer 31 was formed of five laminations of layers, each lamination being constituted by a ferromagnetic layer 316, a nonmagnetic layer 317, and an antiferromagnetic layer 318 stacked one atop another in this stated order, and then stacking a ferromagnetic layer not shown in FIG. 10 on the five laminations of layers. The ferromagnetic layer 316 is 20 nm thick and is formed of $Ni_{80}Fe_{20}$. The nonmagnetic layer 317 is 0.5 nm thick and is formed of Cu. The antiferromagnetic layer 318 is 10 nm thick and is formed of IrMn. The ferromagnetic layer not shown is 850 nm thick and is formed of $Ni_{80}Fe_{20}$. The entire upper shield layer 31 may be constituted by the laminations of films described above. However, for simplification of the fabrication process of the magnetic head, only the underside of the upper shield layer 31 close to the magnetoresistive film can be constituted by the lamination of films. The antiferromagnetic layer 318 can also be formed of PtMn or CrMnPt.

By employing the multilayer film described above, the domain structure of the ferromagnetic film 316 is stabilized, so that locations of the magnetic walls included in the multilayer film can be almost fixed. With this arrangement, the domain structure of the upper shield layer 31 will not be disturbed by a write field generated from the write element, so that a stabilized read output can be obtained. Though the nonmagnetic layer 317 was employed so as to keep the permeability of the upper shield layer 31 at an appropriate level, it can also be omitted for simplification of the fabrication process. In this case, by changing the film thickness of the ferromagnetic layer 316, the appropriate permeability can be obtained.

As described above, the domain structure of the upper shield layer 31 was stabilized. Accordingly, even if the write and read operation was repeated 1000 times, the variation range of the read output was within several percents, which showed further stabilized operations.

Second Embodiment

Figure 11:
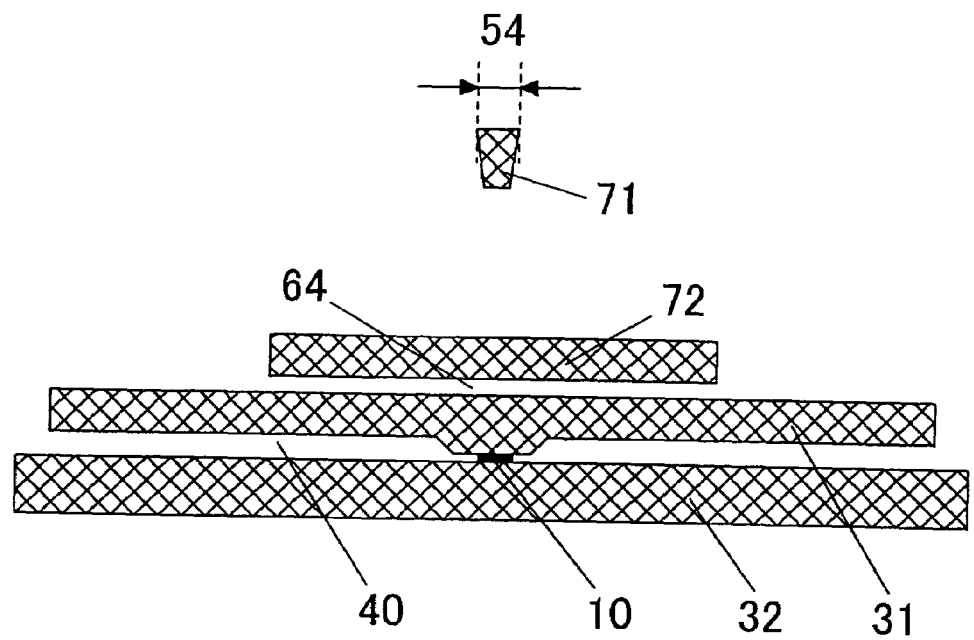
FIG. 11 is a schematic diagram showing an entire air bearing surface of a magnetic head according to a second embodiment of the present invention.

In the first embodiment, the magnetic head that uses the longitudinal write element as the write element was illustrated. In this embodiment, a perpendicular write head is shown. FIG. 11 shows the air bearing surface of the magnetic head in this embodiment. As seen from the side of the substrate not shown, the lower shield layer 32, magnetoresistive film 10, and upper shield layer 31 are formed in this stated order. In the flat portions between the upper shield layer 31 and the lower shield layer 32, far apart from the region where the magnetoresistive film 10 is formed, the gap layer 40 made by stacking the insulating gap layers 41 and 42 was formed.

On this read element, the nonmagnetic separation layer 64 is formed, and a return pole 72 was formed on the nonmagnetic separation layer 64. The nonmagnetic separation layer 64 is 500 nm thick and is formed of alumina. The return pole is 2 μm thick and is formed of a Ni—Fe alloy. A main pole 71 with a thickness of 200 nm, formed of a Fe—Co alloy was formed over the return pole. The main pole 71, as enlarged in FIG. 11, was formed to have a shape of an inverse trapezoid having a large upper portion and a narrow lower portion, and the write core width 54 was set to 130 nm. A distance between the main pole 71 and the return pole 72 is approximately 5 μm.

Figure 12:
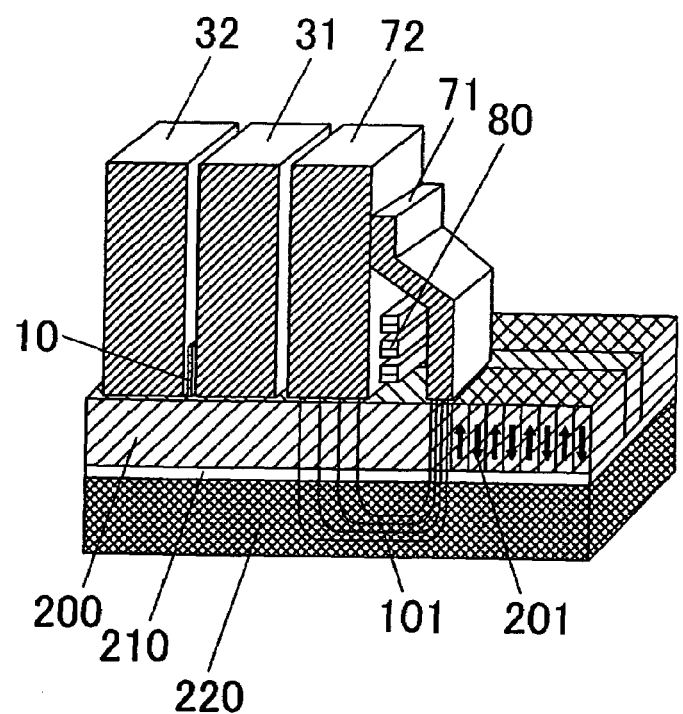
FIG. 12 is a perspective sectional view of the magnetic head according to the second embodiment of the present invention.

A section of a schematic perspective view of the magnetic head in this embodiment is shown in FIG. 12. The coil 80 for generating a magnetic flux is formed between the main pole 71 and the return pole 72. By passing a current for writing a desired pattern through the coil, the write field 101 is generated in the magnetic gap between the main pole 71 and the return pole 72. The write field is thereby applied to the medium 200 in the desired pattern, and the recorded magnetization 201 is written onto the medium 200. In order to effectively utilize the magnetic field generated from the magnetic head for vertical recording, a soft magnetic underlayer 220 with a thickness of approximately 200 nm and a nonmagnetic separation film 210 with a thickness of approximately 5 nm that overlays the soft magnetic underlayer were formed as a base for the medium 200. By detecting a magnetic field leaked from the recorded magnetization 201 written on the medium 200 through the magnetoresistive film 10, recorded information is reproduced.

In this embodiment as well, as in the first embodiment, in order to stabilize the readout output waveform, stacking of the domain stabilization layer constituted by the ferromagnetic layer 22 and the antiferromagnetic layer 23 as the magnetoresistive film 10 is important. Further, it is effective to make the upper shield layer 31 to be of the structure constituted by the multilayer film formed by stacking the ferromagnetic layer, nonmagnetic layer, and ferromagnetic layer one atop another in this stated order. Alternatively, it is effective to make the upper shield layer 31 to be of the structure constituted by the multilayer film formed by stacking the ferromagnetic layer and the antiferromagnetic layer one atop another, or the structure with the multilayer film formed by stacking the ferromagnetic layer, nonmagnetic layer, and antiferromagnetic layer one atop another in this stated order.

Third Embodiment

In the foregoing embodiments, the side shield layers were formed of portions of the upper shield layer. In this embodiment, with reference to FIG. 13, an example is shown where the side shield layers were formed by other process.

Figure 13:
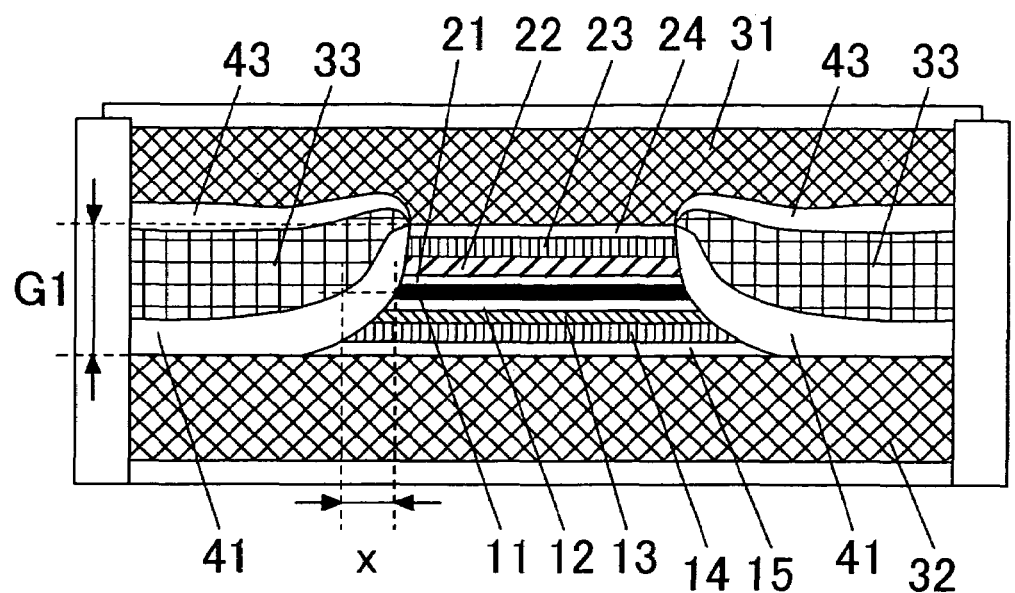
FIG. 13 is a schematic diagram of an enlargement of a portion around the magnetoresistive film in an air bearing surface of a magnetic head according to a third embodiment of the present invention.

FIG. 13 is a diagram showing an enlargement of a portion around the magnetoresistive film of a read element of a magnetic head according to a third embodiment of the present invention. An overview of the magnetic head in this embodiment is the same as that shown in FIGS. 7 and 8, or FIGS. 11 and 12.

The lower shield layer 32 with a thickness of 3 μm, formed of $Ni_{80}Fe_{20}$ was formed over the substrate through a base alumina layer with a thickness of several micrometers, not shown. The lower shield layer 32 also serves as one of the leads electrically coupled to the magnetoresistive film. The TMR film was formed on the lower shield layer 32 to establish electrical coupling with the lower shield layer 32. The TMR film is constituted by the electrically conductive underlayer 15, antiferromagnetic layer 14, second ferromagnetic layer 13, barrier layer 12, and first ferromagnetic layer 11. The detailed structure of the TMR film is the same as the structure in the first embodiment. By employing the Cu layer with a thickness of 2 nm in place of the barrier layer 12, the TMR film can be changed to the CPP-GMR film.

In order to maintain the first ferromagnetic layer 11 in the single domain structure state, the separation layer 21 was formed on the TMR film, and the domain stabilization layer formed by stacking the antiferromagnetic layer 23 on the ferromagnetic layer 22 made of such a material as $Co_{70}Fe_{30}$ was formed on the separation layer 21. In order to make the shield-to-shield spacing G1 to take on a desired value of 60 nm, the electrically conductive cap layer 24 with a thickness of 10 nm was stacked on the domain stabilization layer. The detailed structure of the domain stabilization layer is the same as the structure in the first embodiment. By disposing the domain stabilization layer, even if the domain structure of the first ferromagnetic layer 11 was disturbed by the influence of the write element, the first ferromagnetic layer 11 can be restored to the single domain structure due to the effect of the domain stabilization layer. The multilayer films described above, such as the TMR film and the domain stabilization layer, were patterned so that the width of the barrier layer 12 takes on a desired value. In this embodiment, the width of the barrier layer 12 was set to 100 nm. When performing patterning, a photoresist formed to have a predetermined width was disposed over the above-mentioned multilayer films, and then with this photoresist employed as a mask, a peripheral portion that becomes unnecessary was etched.

Then, before this mask was removed, the insulating gap layer 41 with a film thickness of 20 nm, made of a material such as alumina or silicon oxide was formed. Further, a side shied layer 33 with a thickness of 50 nm, formed of such a material as $Ni_{80}Fe_{20}$ was formed on the insulating gap layer 41, and an insulating gap layer 43 with a thickness of 10 nm was stacked on the side shield layer 33.

Next, the mask was removed, and the upper shield layer 31 with a thickness of 2 μm, formed of $Ni_{80}Fe_{20}$ was stacked on the patterned multilayer films to as to be electrically coupled to the patterned laminate films. The upper shield layer 31 also serves as the other one of the leads to be electrically coupled to the magnetoresistive film. The shield-to-shield spacing G1 between the upper shield layer 31 and the lower shield layer 32 in the portion where the TMR film is present is 60 nm. When changing the shield-to-shield spacing G1, the film thickness of the antiferromagnetic layer 14, anti-ferromagnetic layer 23, or electrically conductive cap layer 24 should be primarily changed.

The side shield layer 33 is formed over the 20 nm-thick insulating gap layer 41. Thus, a pair of side shield layers 33 resulting from this formation process are located just by the sides of the first ferromagnetic layer 11, or near the extended lines of the trackwidth edges of the first ferromagnetic layer 11, and the distance x between the first ferromagnetic layer 11 and the side shield layer 33 is approximately 20 nm. In this embodiment, the distance x is formed to be narrower than the shield-to-shield spacing G1.

The magnetic head in this embodiment was flown over a rotating magnetic disk medium with its magnetic spacing from a magnetic disk medium being 15 nm, and then the write and read characteristic of the magnetic head was evaluated. As in the first embodiment, a high output of 1 mV or higher was obtained. Further, the magnetic track width was approximately 125 nm, and the side reading was 25 nm. From above data, the magnetic head in this embodiment was also found to have a high read sensitivity and enable reduction in side readings, thereby being suitable for achieving a narrow track width.

The shapes of the upper shield layer 31 and the side shield layer 33 will be further described with reference to FIG. 14. The upper shield layer 31 and the lower shield layer 32 also serve as the leads for the magnetoresistive film 10. The widths of the upper shield layer 31 and the lower shield layer 32 were set to approximately 30 μm, approximately 35 μm, respectively. Since the thicknesses of the insulating gap layer 41 and the insulating gap layer 43 above and below the side shield layer 33 are 20 nm, and 10 nm, respectively, which are narrow. Thus, insulation of these gap layers might be broken. Further, portions in which the upper shield layer 31 faces the side shield layer 33, and the side shield layer 33 faces the lower shield layer 32 serve as electrical condensers. When the capacity of the condenser is large, the low-pass filter is formed. Accordingly, the high-frequency characteristic of the read output deteriorates.

Figure 14:
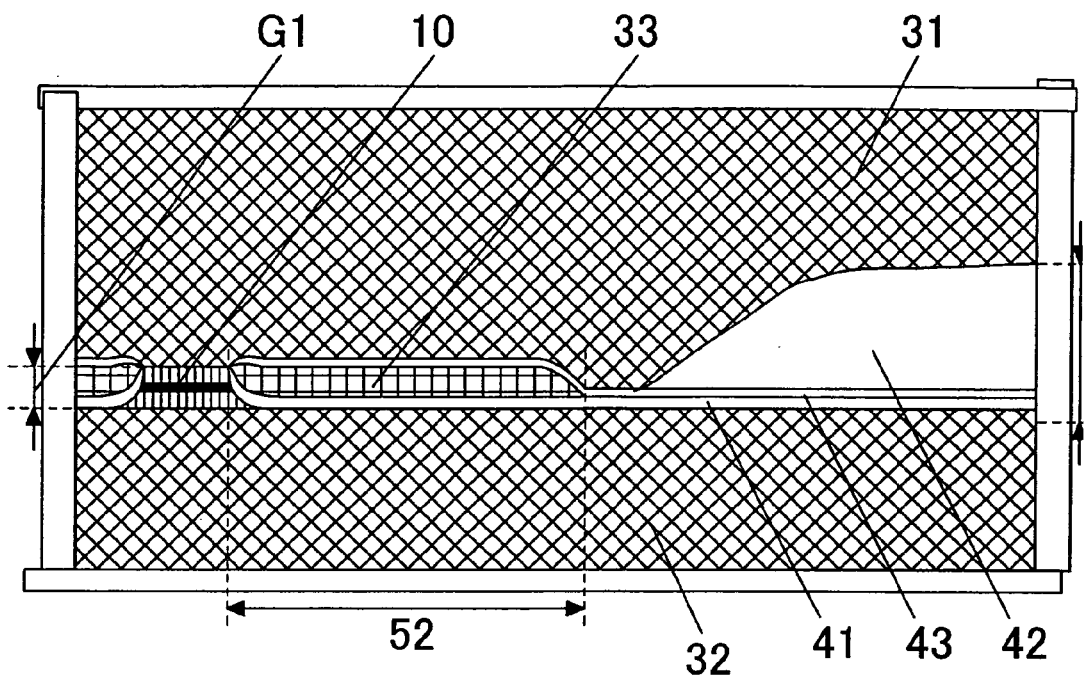
FIG. 14 is a schematic diagram showing an enlargement of a portion around the magnetoresistive film in the air bearing surface of the magnetic head according to the third embodiment of the present invention.

In order to reduce the probability of the insulation breakage and to keep the capacity of the condenser low, the spacing between the upper and lower shield layers in the outer portions of the side shield layers 33 was widened to be set to G3, as shown in FIG. 14. The thickness of the spacing G3 may be selected appropriately in the range from 100 nm to 1000 nm. In order to increase the spacing to G3, after formation of the insulating gap layers 41 and 43, gap layers 42 formed of a material such as alumina were stacked on the outer portions of the side shield layers 33. The width 52 of each side shield layer 33 is preferably from 100 nm to 10 µm. The narrower the width of the spacing where the upper and lower shield layers face to each other is, the lower the probability of the insulation breakage and the capacity can be made. If the spacing is set to be too narrow, however, fabrication of the magnetic head becomes difficult. Further, the permeability is reduced, so that the side shield layers 33 do not satisfactorily function as the side shields.

When the domain structure of the side shield layer 33 has been disturbed by the influence of a write field generated from the write element, the magnetization state of the magnetoresistive film 10 greatly varies due to a magnetic field generated from the magnetic wall of the domain structure of the side shield layer 33, so that the read output varies. In order to stabilize the domain structure of the side shield layer 33, it is effective to make the side shield layers 33 to have a structure constituted by the multilayer film formed by stacking the ferromagnetic layer, nonmagnetic layer, and ferromagnetic layer one atop another in this stated order. Alternatively, it is effective to make the side shield layers 33 to have a structure constituted by the multilayer film formed by stacking the ferromagnetic layer and the antiferromagnetic layer, or a structure constituted by the multilayer film formed by stacking the ferromagnetic layer, nonmagnetic layer, and antiferromagnetic layer one atop another in this stated order.

Figure 15:
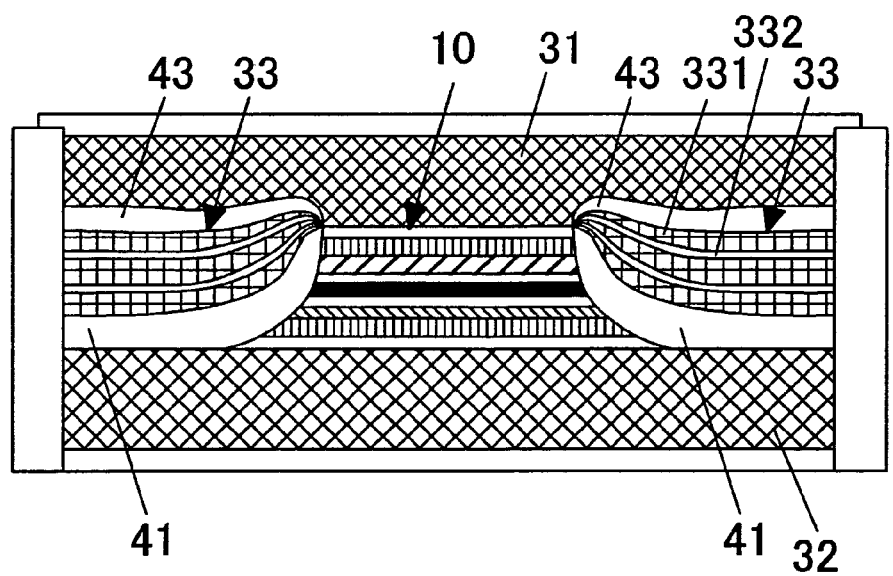
FIG. 15 is a schematic diagram showing an enlargement of a portion around the magnetoresistive film in an air bearing surface of the magnetic head according to the third embodiment of the present invention.

FIG. 15 shows an example where the side shield layer 33 was constituted by the multilayer film formed by stacking the ferromagnetic layer, nonmagnetic layer, and ferromagnetic layer one atop another in this stated order. The side shield layer 33 was formed by alternately stacking the ferromagnetic layer 331 with a thickness of 10 nm, made of $Ni_{80}Fe_{20}$ on a nonmagnetic layer 332 with a thickness of 2 nm, made of $Ni_{80}Cr_{20}$. The nonmagnetic layer 332 can also be formed of Ta. Alternatively, the nonmagnetic layer 332 can be formed of Ir, Ru, Rh, or Cu, with a thickness from 1 nm to several nm.

Figure 16:
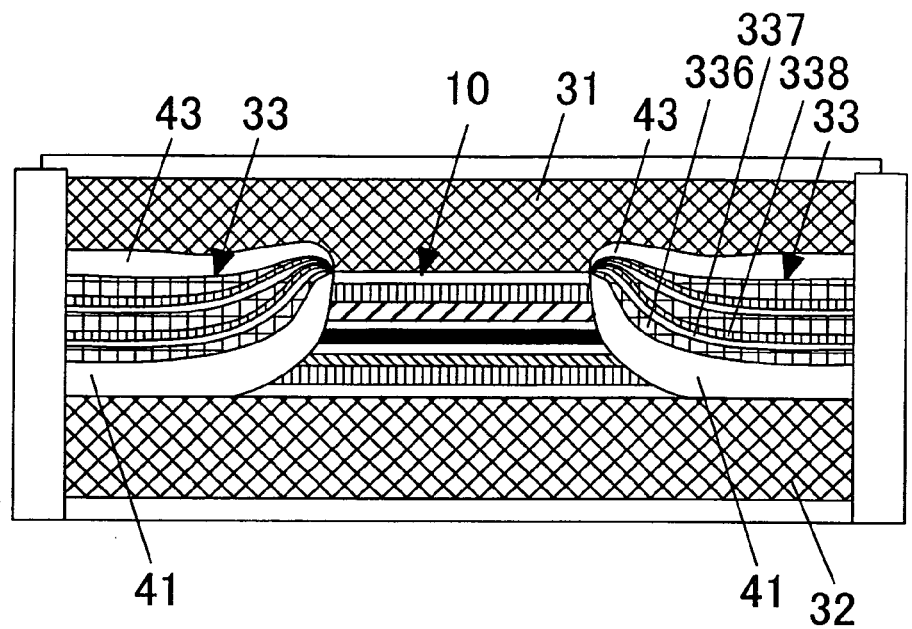
FIG. 16 is a schematic diagram showing an enlargement of a portion around the magnetoresistive film in an air bearing surface of the magnetic head according to the third embodiment of the present invention.

FIG. 16 shows an example where the side shield layer 33 was constituted by the multilayer film formed by stacking the ferromagnetic layer, nonmagnetic layer, and antiferromagnetic layer one atop another in this stated order. The side shield layer 33 was formed of five laminations of layers, each lamination being constituted by a ferromagnetic layer 336, a nonmagnetic layer 337, and an antiferromagnetic layer 338 stacked one atop another in this stated order. The ferromagnetic layer 336 is 100 nm thick and is formed of $Ni_{80}Fe_{20}$. The nonmagnetic layer 337 is 0.7 nm thick and is formed of Cu. The antiferromagnetic layer 338 is 10 nm thick and is formed of IrMn. The antiferromagnetic layer 338 can also be formed of PtMn or CrMnPt. Further, for simplification of the fabrication process, the nonmagnetic layer 337 can also be omitted.

By using the configurations described above, even if the write and read operation was repeated 1000 times, the variation range of the read output was within several percents, which was a sufficiently low value in view of practical applications.

Fourth Embodiment

Figure 17:
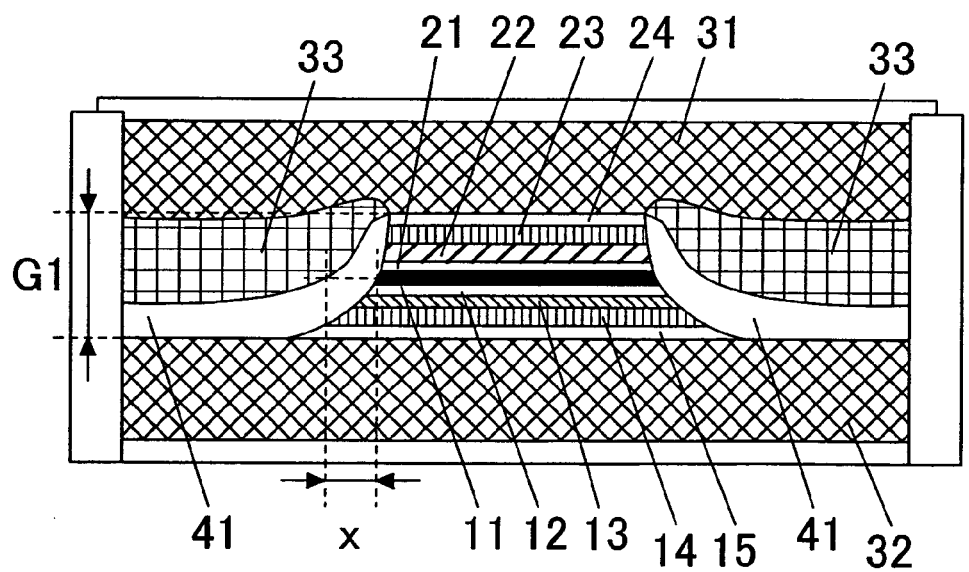
FIG. 17 is a schematic diagram showing an enlargement of a portion around the magnetoresistive film in an air bearing surface of a magnetic head according to a fourth embodiment of the present invention.
Figure 18:
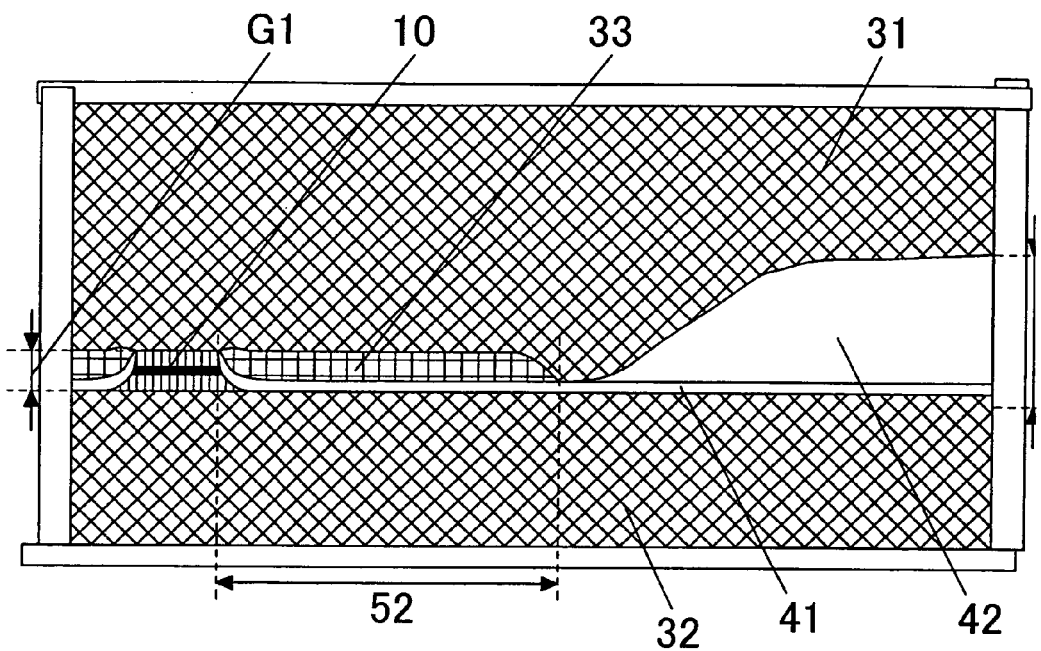
FIG. 18 is a schematic diagram showing an enlargement of a portion around the magnetoresistive film of the air bearing surface of the magnetic head according to the fourth embodiment of the present invention.

In the third embodiment, the insulating gap layers 41 and 43 were formed above and below the side shield layers 33. As shown in FIG. 17, the insulating gap layer 43 can be omitted. By omitting the insulating gap layer 43, the fabrication process of the magnetic head can be simplified, thereby facilitating fabrication of the magnetic head. In addition, the side shield layers 33 and the upper shield layer 31 can be magnetically coupled. With this arrangement, the domain structures of the side shield layers 33 can be more stabilized.

In this embodiment as well, in order to reduce the probability of the insulation breakage between the upper shield layer 31 and the lower shield layer 32, and further to keep the capacity of the condenser generated in the spacing between the upper shield layer 31 and the lower shield layer 32 at a low level, it is preferable for the spacings between the upper and lower shield layers in the outer portions of the side shield layers 33 to be widened to G3. Preferably, the thickness of the G3 is set to be approximately from 100 nm to 1000 nm.

In this embodiment, in order to avoid the insulation breakage between the upper shield layer 31 and the lower shield layer 32, the side shield layer 33 can be formed of a soft magnetic material with a high resistivity. As the soft magnetic material, a multilayer film formed with a CoFe film with a thickness of approximately 2 nm and a CoFe oxide film obtained by natural oxidization of the CoFe film, a discontinuous multilayer film obtained by alternately stacking the CoFe film with a thickness of approximately 1.5 nm and an alumina film, or a composite film formed of CoFe and alumina or Fe and $SiO_2$, for example, can be employed. By optimizing formation conditions, these soft magnetic materials with the high resistivity can set the permeability of the side shield layer 33 to a high value in the range from 100 to 1000, while keeping the high magnetoresistive ratio of the shield layer 33 at approximately 10 mΩ·cm. In addition, with these materials, a film with a high resistivity of 100 mΩ·cm or higher can also be obtained.

When the resistivity is 100 mΩ·cm or higher, the insulating gap layer 41 formed between the side shield layer 33 and the lower shield layer 32 can also be omitted. However, in this case as well, preferably, separation layers are formed between the magnetoresistive film 10 and the side shield layers 33 so that the side shield layers 33 do not come into direct contact with the magnetoresistive film 10.

Fifth Embodiment

Figure 19:
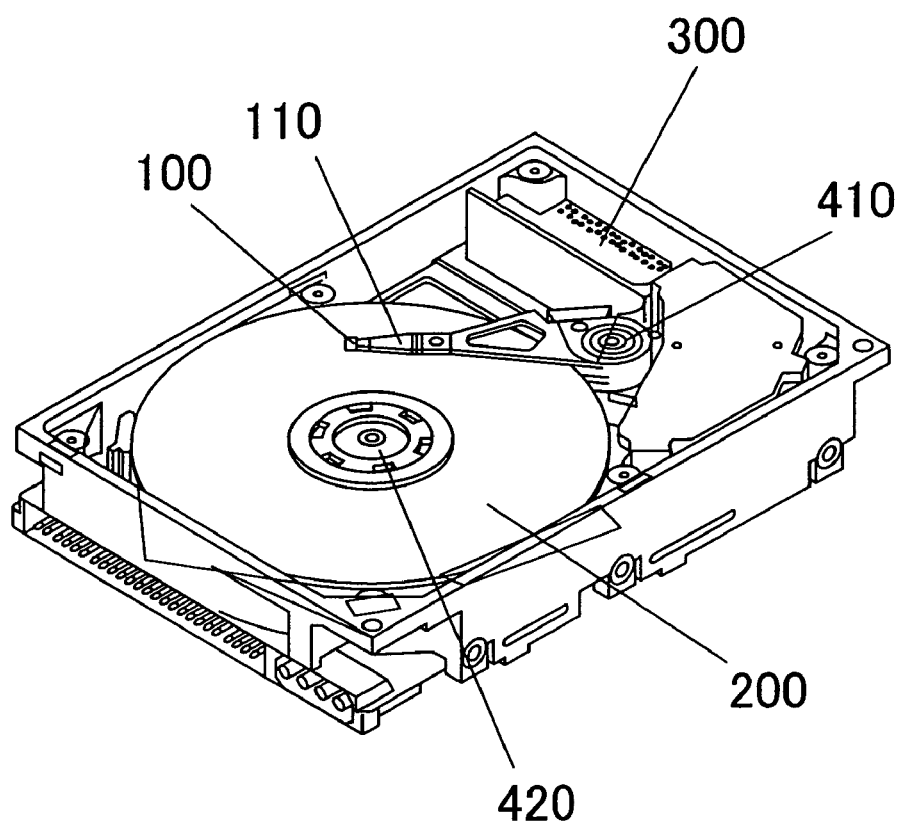
FIG. 19 is a perspective view of a magnetic disk apparatus according to a fifth embodiment of the present invention.

A magnetic recording and reproducing apparatus with a high areal density can be realized with the magnetic head described heretofore. FIG. 19 schematically shows a magnetic disk apparatus, which is an embodiment of the present invention.

The magnetic disk apparatus includes a magnetic disk 200 for magnetically recording information, means 420 such as a spindle motor, for rotating the magnetic disk 200, a magnetic head 100 such as the integral-type thin film magnetic head with the write and read elements stacked on the substrate, for recording a signal in the magnetic disk 200 and reproducing the signal from the magnetic disk 200, a suspension 110 formed of an elastic member, for supporting the magnetic head 100, means 410 such as a carriage actuator, for positioning the magnetic head 100, and a circuit module 300 having a circuit for processing recording and reproducing signals mounted thereon.

By configuring the magnetic head as described above, even if the magnetic read track width was as narrow as 100 nm or less, the stabilized read output of 1 mV or higher could be obtained. Further, even if the write and read operation was repeated, the stabilized read output could be obtained. As a result, the magnetic disk apparatus having the areal density of 100 gigabits or higher per square inch could be obtained.

Figure 20:
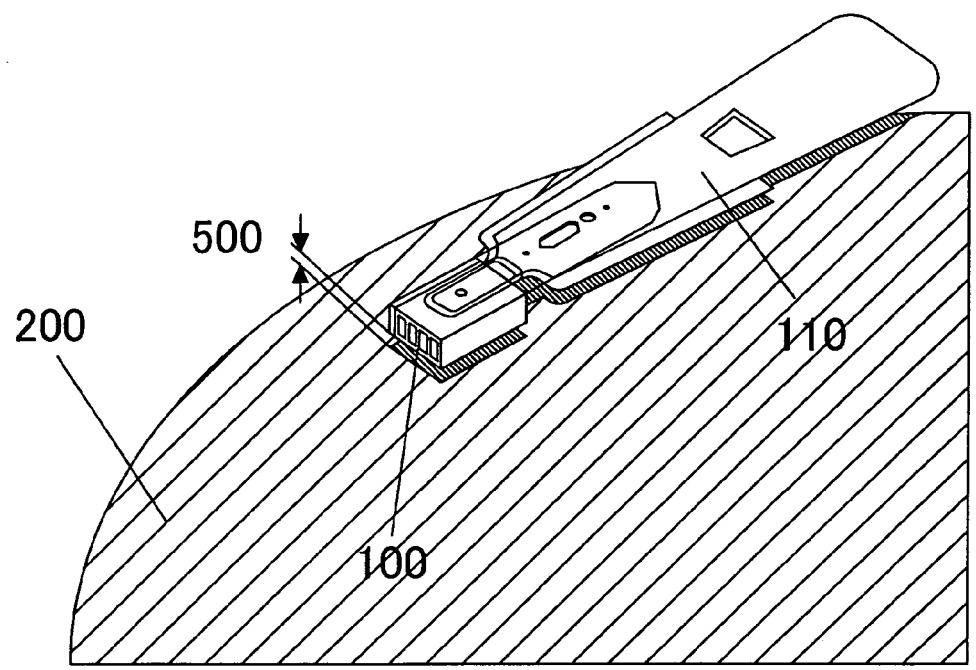
FIG. 20 is a schematic diagram showing an enlargement of a portion around the magnetic head of the magnetic disk apparatus according to the fifth embodiment of the present invention.

FIG. 20 is a diagram showing an enlargement of a portion near the magnetic head 100 that flies above the rotating magnetic disk 200. A distance between a magnetic metal layer on the air bearing surface of the magnetic head 100 and a magnetic layer of the magnetic disk 200, or a magnetic spacing 500 was set to 15 nm. This distance is achieved by a balance between buoyancy obtained from rotation of the magnetic disk 200 and a pushing force from the suspension 110 that supports the magnetic head 100.

In order to reduce malfunctions of the magnetic disk apparatus, the write core width 53 or 54 of the write element should be the same as or wider than the magnetic read track width of the read element. Specifically, the write core width should be the same as or wider than a value obtained by adding a magnetic spacing d between the magnetic head and the medium and a half of the distance x between the side shield layer and the magnetoresittive film to a width Twr of the magnetoresistive film, or Twr+d+x/2.

In the first embodiment, the write core width 53 of the longitudinal write element was set to 150 nm, while in the second embodiment, the write core width 54 of the perpendicular write element was set to 130 nm. In either case, the width Twr of the magnetoresistive film 10 was 100 nm, the magnetic spacing d between the magnetic head and the disk medium was 15 nm, and the distance x between the side shield layer and the magnetoresistive film was 20 nm. Thus, the resulting write core width of 125 nm is obtained by using a formula of Twr+d+x/2. Since the write core widths 53 and 54 were set to be larger than this value or the magnetic write track width of the read element, malfunction of the apparatus due to a decrease in the read output or reading of a signal component on an adjacent track resulting from a positioning error of the magnetic head did not occur.

As described above, according to the present invention, a pair of the magnetic side shield layers was formed on both sides of the track width edges of the magnetoresistive film, and a spacing between each magnetic side shield layer and the adjacent track width of the magnetoresistive film was optimally set. The side reading by the read element due to the magnetoresistive film was thereby made to be narrower than the theoretical value defined by the shield-to-shield spacing between the upper and lower shield layers and the magnetic spacing, or more specifically, narrower than twice the spacing between the upper and lower shield layers. More preferably, the spacing between each magnetic side shield layer and the adjacent track width edge of the magnetoresistive film was made to be narrower than the shield-to-shield spacing. Thus, even if the track width is narrow and on the order of 100 nm, side readings can be reduced. The magnetic recording head that can be readily fabricated and accommodates narrow tracks can be provided. Accordingly, the magnetic recording and reproducing apparatus with a high areal density can be realized.

Further, as the side reading is reduced, the width of the magnetoresistive film can be correspondingly widened, though the magnetic head accommodates narrow tracks. Thus, the magnetic recording head can be provided which exhibits a high sensitivity even if its track width is narrow. Accordingly, a magnetic recording and reproducing apparatus that has a high recording density, but scarcely malfunctions can be provided.

The present invention further includes the following features.

(a) A magnetic recording and reproducing apparatus comprising: a magnetic recording head comprising a read element and a write element having a coil for generating a magnetic flux and a pair of magnetic cores for collecting the magnetic flux, the read element comprising a pair of magnetic upper and lower shield layers formed apart from each other with a predetermined spacing therebetween and a magnetoresistive film formed between the pair of magnetic upper and lower shield layers through electrically conductive layers having predetermined thicknesses interposed between one of the magnetic shield layers and the magnetoresistive film and between the other one of the magnetic shield layers and the magnetoresistive film, the magnetoresistive film comprising a multilayer film formed by stacking a first ferromagnetic layer on a nonmagnetic layer, the nonmagnetic layer on a second ferromagnetic layer, and the second ferromagnetic layer on an antiferromagnetic layer or by stacking the antiferromagnetic layer on the second ferromagnetic layer, the second ferromagnetic layer on the nonmagnetic layer, and the nonmagnetic layer on the first ferromagnetic layer, a pair of magnetic side shield layers being formed on both sides of the magnetoresistive film in a track width direction, a spacing between each of the magnetic side shield layers and an adjacent trackwidth edge of the magnetoresistive film being set to be narrower than twice the spacing between the magnetic upper and lower shield layers; and write and read operation control means for recording information in media using the magnetic recording head, based on an input signal, and reproducing information based on an output signal from the magnetic recording head.

(b) A magnetic recording and reproducing apparatus comprising: a magnetic recording head comprising a read element and a write element having a coil for generating a magnetic flux and a pair of magnetic cores for collecting the magnetic flux, the read element comprising a pair of magnetic shield layers formed apart from each other with a predetermined spacing therebetween and a magnetoresistive film formed between the pair of magnetic shield layers through electrically conductive layers having predetermined thicknesses interposed between one of the magnetic shield layers and the magnetoresistive film and between the other one of the magnetic shield layers and the magnetoresistive film, the magnetoresistive film comprising a multilayer film formed by stacking a first ferromagnetic layer on a nonmagnetic layer, the nonmagnetic layer on a second ferromagnetic layer, and the second ferromagnetic layer on an antiferromagnetic layer or by stacking the antiferromagnetic layer on the second ferromagnetic layer, the second ferromagnetic layer on the nonmagnetic layer, and the nonmagnetic layer on the first ferromagnetic layer, a spacing between the magnetic shield layers in a location without the magnetoresistive film formed therebetween outside an trackwidth edge of the magnetoresistive film being set to be narrower than a spacing between the magnetic shield layers in a location with the magnetoresistive film formed therebetween, thereby forming portions of one of the magnetic shield layers to be also located on extended lines of the first ferromagnetic layer in a track width direction, a spacing between each of the portions of said one of the magnetic shield layers on the extended lines and the adjacent trackwidth edge of the first ferromagnetic layer being set to be narrower than twice the spacing between the magnetic shield layers in the location with the magnetoresistive film formed therebetween; and write and read operation control means for recording information in media using the magnetic recording head, based on an input signal, and reproducing information based on an output signal from the magnetic recording head.

(c) The magnetic recording and reproducing apparatus according to (a) or (b), wherein the magnetic recording head has an air bearing surface, and between widths of the magnetic cores comprising the write element, the narrower core width is set to be equal to or larger than a value obtained by adding to a width Twr of the magnetoresistive film a magnetic spacing d between the magnetic recording head and the media and a half of a spacing x between said one of the magnetic side shield layers and the magnetoresistive film, or Twr+d+x/2.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A magnetic head comprising:
   a pair of magnetic upper and lower shield layers;
   a magnetoresistive film formed between the pair of magnetic upper and lower shield layers; and
   a pair of leads electrically coupled to the magnetoresistive film which passes a sensing current in a film thickness direction of the magnetoresistive film, wherein
   a pair of magnetic side shield layers are formed on both sides of the magnetoresistive film in a track width direction,
   a spacing (x) between each of the magnetic side shield layers and an adjacent trackwidth edge of the magnetoresistive film is defined so that a side reading by a read element due to the magnetoresistive film becomes smaller than a theoretical value defined by a spacing (G1) defined between the magnetic upper and lower shield layers where the magnetoresistive film is present and a magnetic spacing,
   a spacing (G3) between the magnetic upper and lower shield layers in outer portions of the side shield layers has a thickness of 100 nm to 1000 nm.

2. A magnetic head comprising:
   a pair of magnetic shield layers; and
   a magnetoresistive film formed between the pair of magnetic shield layers through electrically conductive layers having predetermined thicknesses interposed between one of the magnetic shield layers and the magnetoresistive film and between the other one of the magnetic shield layers and the magnetoresistive film, wherein
   the electrically conductive layers are formed to pass a sensing current in a film thickness direction of the magnetoresistive film,
   the magnetoresistive film comprises a multilayer film formed by stacking a first ferromagnetic layer on a nonmagnetic layer, the nonmagnetic layer on a second ferromagnetic layer, and the second ferromagnetic layer on an antiferromagnetic layer or by stacking the antiferromagnetic layer on the second ferromagnetic layer, the second ferromagnetic layer on the nonmagnetic layer, and the nonmagnetic layer on the first ferromagnetic layer, wherein
   a spacing (G2) defined between the magnetic shield layers in a location outside of where the magnetoresistive film is formed therebetween is defined to be narrower than a spacing (G1) defined between the magnetic shield layers in a location with the magnetoresistive film formed therebetween, thereby forming portions of one of the magnetic shield layers to be also located on extended lines of the first ferromagnetic layer in a track width direction,
   a spacing (x) between each of the portions of said one of the magnetic shield layers on the extended lines and an adjacent trackwidth edge of the first ferromagnetic layer is defined to be narrower than twice the spacing (G1) between the magnetic shield layers in the location with the magnetoresistive film formed therebetween.

3. A magnetic head according to claim 2, wherein a spacing (G3) between the magnetic upper and lower shield layers in outer portions of the side shield layers has a thickness of 100 nm to 1000 nm.

4. A magnetic head comprising:
   a pair of magnetic upper and lower shield layers;
   a magnetoresistive film formed between the pair of magnetic upper and lower shield layers; and
   a pair of leads electrically coupled to the magnetoresistive film which passes a sensing current in a film thickness direction of the magnetoresistive film;
   wherein a pair of magnetic side shield layers are formed on both sides of the magnetoresistive film in a track width direction,
   a spacing (x) between each of the magnetic side shield layers and an adjacent trackwidth edge of the magnetoresistive film is defined to be narrower than twice a spacing (G1) defined between the magnetic upper and lower shield layers where the magnetoresistive film is present,
   wherein a spacing (G3) between the magnetic upper and lower shield layers in outer portions of the side shield layers has a thickness of 100 nm to 1000 nm.

* * * * *